US008781500B1

(12) United States Patent
Dekel

(10) Patent No.: US 8,781,500 B1
(45) Date of Patent: Jul. 15, 2014

(54) PROPRIETOR-CONTROLLED LOCATION-BASED SETTING OF NOTIFICATION POLICIES

(75) Inventor: Uri Dekel, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 5 days.

(21) Appl. No.: 13/612,195

(22) Filed: Sep. 12, 2012

(51) Int. Cl.
*H04M 1/00* (2006.01)

(52) U.S. Cl.
USPC ............... 455/456.3; 455/456.2; 455/456.4; 455/412.2; 455/567

(58) Field of Classification Search
USPC .............. 455/456.3, 412.2, 456.4, 456.6, 567
See application file for complete search history.

(56) References Cited

U.S. PATENT DOCUMENTS

| | | | |
|---|---|---|---|
| 6,907,254 B1 | 6/2005 | Westfield | |
| 7,069,027 B2 | 6/2006 | Miriyala | |
| 7,194,278 B1 * | 3/2007 | Cook | 455/461 |
| 7,308,251 B2 * | 12/2007 | Karaoguz | 455/411 |
| 7,668,557 B2 * | 2/2010 | Hong et al. | 455/456.4 |
| 7,769,394 B1 | 8/2010 | Zhu | |
| 8,112,785 B1 * | 2/2012 | Cooley et al. | 726/1 |
| 2003/0228873 A1 * | 12/2003 | Manzen | 455/456.3 |
| 2006/0019645 A1 * | 1/2006 | Azimi et al. | 455/419 |
| 2006/0135140 A1 | 6/2006 | Rothman et al. | |
| 2006/0212757 A1 | 9/2006 | Ross et al. | |
| 2008/0284588 A1 * | 11/2008 | Kim et al. | 340/539.13 |
| 2010/0227629 A1 * | 9/2010 | Cook et al. | 455/456.4 |
| 2012/0021750 A1 * | 1/2012 | Vendrow et al. | 455/445 |
| 2012/0142379 A1 * | 6/2012 | Park | 455/457 |
| 2013/0052990 A1 * | 2/2013 | Zhang | 455/411 |

* cited by examiner

*Primary Examiner* — Qun Shen
(74) *Attorney, Agent, or Firm* — McDonnell Boehnen Hulbert & Borghoff LLP

(57) ABSTRACT

A property could be covered by a mobile device policy map that defines a plurality of spaces within the property and associates each defined space with a respective notification policy regarding how one or more classes of mobile devices are permitted to provide notifications in response to incoming communications. The mobile device policy map for a property could be developed by the proprietor of the property and could be enforced by a server. A mobile device could report its location to the server, and the server could determine that the location is within or proximate to an area covered by a mobile device policy map. The server could then transmit at least a portion of the mobile device policy map to the mobile device, so that the mobile device can apply the relevant policies based on its location.

15 Claims, 12 Drawing Sheets

| Grounds (Space 1) | Hallway (Space 2) | Classrooms (Space 3) | Gym (Space 4) | Cafeteria (Space 5) | Library (Space 6) |
|---|---|---|---|---|---|
| Definition of Space 1 | Definition of Space 2 | Definition of Space 3 | Definition of Space 4 | Definition of Space 5 | Definition of Space 6 |
| Notification Policy | Notification Policy | Notification Policy | Notification Policy | Notification Policy | Notification Policy |
| Class A<br>Audible: Yes<br>Tactile: Yes<br>Visual: Yes | Class A<br>Audible: Yes (Low vol.)<br>Tactile: Yes<br>Visual: Yes | Class A<br>Audible: No<br>Tactile: Yes<br>Visual: Yes | Class A<br>Audible: No<br>Tactile: Yes<br>Visual: Yes | Class A<br>Audible: Yes (Hi vol.)<br>Tactile: Yes<br>Visual: Yes | Class A<br>Audible: No<br>Tactile: Yes<br>Visual: Yes |
| Class B<br>Audible: Yes<br>Tactile: Yes<br>Visual: Yes | Class B<br>Audible: Yes (Low vol.)<br>Tactile: Yes<br>Visual: Yes | Class B<br>Audible: No<br>Tactile: No<br>Visual: No | Class B<br>Audible: No<br>Tactile: Yes<br>Visual: Yes | Class B<br>Audible: Yes<br>Tactile: Yes<br>Visual: Yes | Class B<br>Audible: No<br>Tactile: Yes<br>Visual: Yes |
| Origination Policy | Origination Policy | Origination Policy | Origination Policy | Origination Policy | Origination Policy |
| Class A<br>Voice: Yes<br>Text: Yes | Class A<br>Voice: Yes<br>Text: Yes | Class A<br>Voice: No<br>Text: No | Class A<br>Voice: Yes<br>Text: Yes | Class A<br>Voice: Yes<br>Text: Yes | Class A<br>Voice: No<br>Text: Yes |
| Class B<br>Voice: Yes<br>Text: Yes | Class B<br>Voice: No<br>Text: Yes | Class B<br>Voice: No<br>Text: No | Class B<br>Voice: No<br>Text: Yes | Class B<br>Voice: Yes<br>Text: Yes | Class B<br>Voice: No<br>Text: Yes |
| Application Policy | Application Policy | Application Policy | Application Policy | Application Policy | Application Policy |
| Class A<br>Music: Yes<br>Games: Yes<br>Camera: Yes | Class A<br>Music: No<br>Games: No<br>Camera: Yes | Class A<br>Music: No<br>Games: No<br>Camera: Yes | Class A<br>Music: No<br>Games: No<br>Camera: No | Class A<br>Music: Yes<br>Games: Yes<br>Camera: Yes | Class A<br>Music: No<br>Games: No<br>Camera: Yes |
| Class B<br>Music: Yes<br>Games: Yes<br>Camera: Yes | Class B<br>Music: No<br>Games: No<br>Camera: Yes | Class B<br>Music: No<br>Games: No<br>Camera: No | Class B<br>Music: No<br>Games: No<br>Camera: No | Class B<br>Music: Yes<br>Games: Yes<br>Camera: Yes | Class B<br>Music: No<br>Games: No<br>Camera: Yes |

| Grounds (Space 1) | Hallway (Space 2) | Classrooms (Space 3) | Gym (Space 4) | Cafeteria (Space 5) | Library (Space 6) |
|---|---|---|---|---|---|
| Definition of Space 1 | Definition of Space 2 | Definition of Space 3 | Definition of Space 4 | Definition of Space 5 | Definition of Space 6 |
| Notification Policy | Notification Policy | Notification Policy | Notification Policy | Notification Policy | Notification Policy |
| Audible: Yes<br>Tactile: Yes<br>Visual: Yes | Audible: Yes (Low vol.)<br>Tactile: Yes<br>Visual: Yes | Audible: No<br>Tactile: No<br>Visual: No | Audible: No<br>Tactile: Yes<br>Visual: Yes | Audible: Yes<br>Tactile: Yes<br>Visual: Yes | Audible: No<br>Tactile: Yes<br>Visual: Yes |
| Origination Policy | Origination Policy | Origination Policy | Origination Policy | Origination Policy | Origination Policy |
| Voice: Yes<br>Text: Yes | Voice: No<br>Text: Yes | Voice: No<br>Text: No | Voice: No<br>Text: Yes | Voice: Yes<br>Text: Yes | Voice: No<br>Text: Yes |
| Application Policy | Application Policy | Application Policy | Application Policy | Application Policy | Application Policy |
| Music: Yes<br>Games: Yes<br>Camera: Yes | Music: No<br>Games: No<br>Camera: Yes | Music: No<br>Games: No<br>Camera: No | Music: No<br>Games: No<br>Camera: No | Music: Yes<br>Games: Yes<br>Camera: Yes | Music: No<br>Games: No<br>Camera: Yes |

PROPRIETOR-CONTROLLED LOCATION-BASED SETTING OF NOTIFICATION POLICIES

BACKGROUND

Mobile devices, such as cellphones, are often configured to alert a user of incoming voice calls or other incoming communications through the use of audible, visual, and/or tactile notifications. Typically, a mobile device provides functionality to allow a user to indicate the manner in which the mobile device provides such notifications. For example, the mobile device may provide an option and/or setting that allows the user to indicate a volume level at which the mobile device provides audible notifications. In addition, the mobile device may allow a user to disable audible notifications altogether, so that the mobile device provides only visual notifications (such as a pop-up message on a display) and/or tactile notifications (such as a vibration). The mobile device may allow the user to indicate other attributes or settings of such notifications based on the environment in which the mobile device is currently operating. For example, a user may indicate that audible notifications are to be suppressed in locations where unexpected sounds may be socially unacceptable or prohibited.

Despite the above-described customization functionality, instances in which a mobile device provides an undesired notification can still occur. This can happen, for example, when the user is unaware of what behavior is generally appropriate in a given setting or when the user inadvertently fails to appropriately adjust the settings on the user's mobile device.

SUMMARY

In a first aspect, a method is provided. The method comprises: (a) maintaining, by a server, policy information that relates to a predefined area; (b) receiving, at the server, an indication of a location of a mobile device; (c) determining, by the server, that the location is within or proximate to the predefined area; and (d) transmitting at least a portion of the policy information to the mobile device. The policy information defines a plurality of spaces and associates each defined space with one or more respective policies. The one or more respective policies are selected from the group consisting of a notification policy regarding how one or more classes of mobile devices are permitted to provide notifications in response to incoming communications, an origination policy regarding what communications the one or more classes of mobile devices are permitted to originate, and an application policy regarding what applications the one or more classes of mobile devices are permitted to use.

In a second aspect, a server is provided. The server comprises at least one processor, data storage, and instructions stored in the data storage. The instructions are executable by the at least one processor to cause the server to perform functions, the functions comprising: (a) maintaining policy information that relates to a predefined area; (b) receiving an indication of a location of a mobile device; (c) determining that the location is within or proximate to the predefined area; and (d) transmitting at least a portion of the policy information to the mobile device. The policy information defines a plurality of spaces and associates each defined space with one or more respective policies. The one or more respective policies are selected from the group consisting of a notification policy regarding how one or more classes of mobile devices are permitted to provide notifications in response to incoming communications, an origination policy regarding what communications the one or more classes of mobile devices are permitted to originate, and an application policy regarding what applications the one or more classes of mobile devices are permitted to use.

In a third aspect, a non-transitory computer readable medium is provided. The non-transitory computer readable medium has stored therein instructions executable by a computing device to cause the computing device to perform functions, the functions comprising: (a) maintaining policy information that relates to a predefined area; (b) receiving an indication of a location of a mobile device; (c) determining that the location is within or proximate to the predefined area; and (d) transmitting at least a portion of the policy information to the mobile device. The policy information defines a plurality of spaces and associates each defined space with one or more respective policies. The one or more respective policies are selected from the group consisting of a notification policy regarding how one or more classes of mobile devices are permitted to provide notifications in response to incoming communications, an origination policy regarding what communications the one or more classes of mobile devices are permitted to originate, and an application policy regarding what applications the one or more classes of mobile devices are permitted to use.

In a fourth aspect, a method is provided. The method comprises: (a) receiving, by a mobile device, policy information that defines at least a first space and associates the first space with at least a first notification policy regarding how the mobile device is permitted to provide notifications in response to incoming communications when operating in the first space; (b) determining, by the mobile device, a location of the mobile device; (c) comparing, by the mobile device, the location of the mobile device to at least the first space defined in the policy information; and (d) applying the first notification policy on the mobile device, in response to a determination that the location is within the first space.

In a fifth aspect, a method is provided. The method comprises: (a) receiving, by a mobile device, policy information that defines at least a first space and associates the first space with at least a first origination policy regarding what communications the mobile device is permitted to originate when operating in the first space; (b) determining, by the mobile device, a location of the mobile device; (c) comparing, by the mobile device, the location of the mobile device to at least the first space defined in the policy information; and (d) applying the first origination policy on the mobile device, in response to a determination that the location is within the first space.

In a sixth aspect, a method is provided. The method comprises: (a) receiving, by a mobile device, policy information that defines at least a first space and associates the first space with at least a first application policy regarding what applications the mobile device is permitted to use when operating in the first space; (b) determining, by the mobile device, a location of the mobile device; (c) comparing, by the mobile device, the location of the mobile device to at least the first space defined in the policy information; and (d) applying the first application policy on the mobile device, in response to a determination that the location is within the first space.

In other aspects, a mobile device is provided. The mobile device comprises at least one processor, data storage, and instructions stored in the data storage and executable by the at least one processor to cause the mobile device to perform functions. The functions can include any of the methods described above for the fourth, fifth, and six aspects.

In still other aspects, a non-transitory computer readable medium is provided. The computer readable medium has stored therein instructions executable by at least one processor in a mobile device to cause the mobile device to perform functions. The functions can include any of the methods described above for the fourth, fifth, and six aspects.

These as well as other aspects, advantages, and alternatives will become apparent to those of ordinary skill in the art by reading the following detailed description with reference where appropriate to the accompanying drawings. Further, it is be understood that the description provided in this summary section and elsewhere in this document is intended to illustrate the claimed subject matter by way of example and not by way of limitation.

BRIEF DESCRIPTION OF THE FIGURES

FIG. 6 illustrates a mobile device policy map, in accordance with an example embodiment.

FIG. 6A illustrates a portion of the mobile device policy map of FIG. 6, in accordance with an example embodiment.

DETAILED DESCRIPTION

Figure 1:
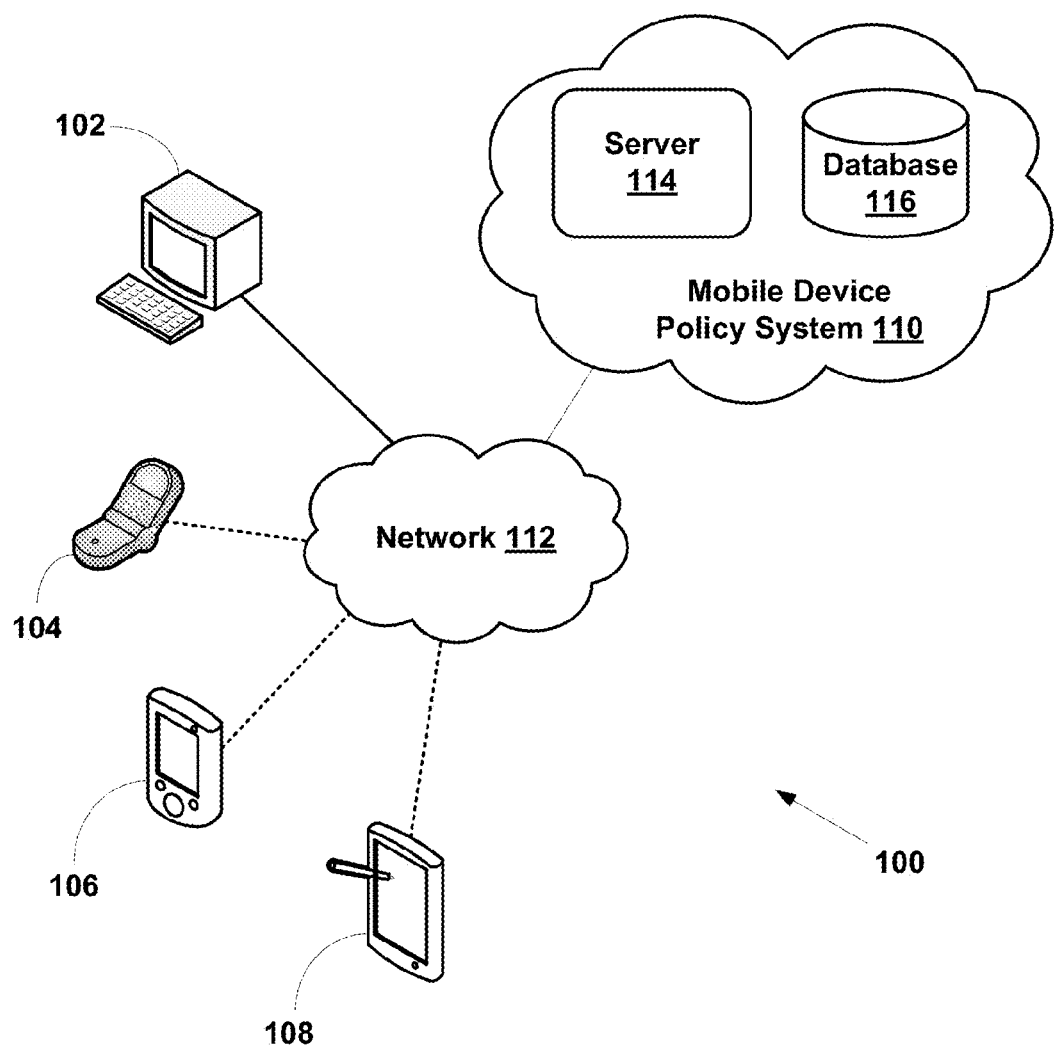
FIG. 1 illustrates a communication system, in accordance with an example embodiment.

Disclosed herein are methods and systems for developing and enforcing policies regarding, for example, how mobile devices are to provide notifications in response to incoming communications based on a current location or environment. In example implementations, a "proprietor," who owns, uses, or manages a property can define one or more mobile device policies for defined spaces in or surrounding the property. For example, the property could be a building and the defined spaces could be different rooms in the building. The proprietor could be an organization, such as a business or other for-profit enterprise, or a non-profit enterprise, such as an educational institution. Alternatively, the proprietor could be an individual or group of individuals.

A mobile device policy for a given space could include, for example, one or more of the following: (1) a notification policy specifying attributes of acceptable mobile device notifications for mobile devices operating in the given space; (2) an origination policy regarding what communications mobile devices are permitted to originate when operating in the given space; and (3) an application policy regarding which applications, such as camera, game, or music applications, mobile devices are permitted to use when operating in the given space.

A notification policy could specify, for example, whether audible notifications (such as ring-tones), are permissible and, if so, at what volume. A notification policy could further specify that audible notifications are not permitted in the given area but that tactile and/or visible notifications are permitted.

In another example, if the property is a school, the notification policies for classrooms and for the library could specify that audible notifications are not permitted, whereas the notification policies for the cafeteria, hallways, and outdoor areas could specify that audible alerts are permitted. For an office building, the notification policies for offices, conference rooms, and other work-related areas could specify that audible notifications are not permitted, whereas the notifications policies for cafeterias, break rooms, lounges, and other non-work-related areas could specify that audible notifications are permitted.

In some examples, notification policies could make distinctions based on types and/or classifications of mobile devices. Such classifications could relate to the type of mobile device and/or an identity of a user of the mobile device. For example, a school setting could have three sets of notification policies: a policy for students, a different policy for teachers, and a still different policy for certain high-priority staff (such as maintenance, security, or supervisory staff). Thus, a notification policy for a quiet space (such as a classroom or library) specifying that audible notifications are not permitted on mobile devices used by students or teachers could make an exception for mobile devices used by high-priority staff. In addition, notification policies could make distinctions based on the time of day and/or day of the week during which a mobile device is being used. For example, a notification policy for a work area at a business could specify that audible notifications are not permitted during working hours but are permitted at other times.

Origination policies and application policies can also be defined for different spaces based on the intended use of such spaces. For example, in a school, classrooms could have origination policies that do not allow mobile devices to originate any communications (except for emergency communications), whereas libraries and study areas could have origination policies that allow mobile devices to originate text messages but not voice calls, and outdoor areas could have origination policies that allow mobile devices to originate any type of communication. The school could also have application policies for classrooms that restrict the use of certain types (or all types) of applications and application policies for other areas that are less restrictive. Other examples are also possible. In addition, origination policies and application policies could define permitted and/or prohibited functions based on mobile device classes, time of day and/or day of the week.

To enforce mobile device policies, a proprietor can subscribe to a policy-enforcement service that is hosted on one or more local and/or remotely-located servers that are network-accessible by mobile devices operating at or near a property of the proprietor. For example, a proprietor of a property could define a mobile device policy map that defines a plurality of spaces in the property and associates each defined space with a respective mobile device policy. Each mobile device policy map could include a notification policy, an origination policy, and/or an application policy similar to those described above. A space could be defined based on, for example, geographic coordinates, the locations of one or more rooms in a building, the presence of access points or other signal sources, the distances to reference points, or could be defined in other ways. In one approach, the proprietor could define physical boundaries and/or dimensions of the property or of part of the property (e.g., a floor plan of a building); further boundaries to define different spaces within the property; and descriptions of the mobile device policies associated with the various defined spaces. Once the proprietor has defined the mobile device policy boundaries, the proprietor can upload the same to a server configured to execute a service that administers and/or enforces the mobile device policies in accordance with the mobile device policy boundaries.

A mobile device could be subject to the above-described service, either automatically upon entry of the mobile device within the physical ambit of the dimensions defined by the proprietor (but with the ability to opt out) or only once the mobile device has opted in to the service. In some cases, a proprietor of a property could require mobile device users to direct his/her mobile device to opt in to the service as a condition for using mobile devices within the property.

A mobile device that is subject to a policy-enforcement service could be configured to query a policy-enforcement server (such as the server described above) at various times, such as every 10 seconds. Such queries could include an indication of the mobile device's current location, an identification of the user, an identification of the mobile device, as well as authentication information. In some implementations the server can receive a query and determine whether the indicated current mobile device location is within an area covered by a mobile device policy map and/or whether the indicated location is proximate to (within a predetermined distance of) an area covered by a mobile device policy map. If the indicated location is within an area that is covered by a mobile device policy map, then the server can respond in one of two ways.

In a first approach, the server can determine which space in the applicable mobile device policy map corresponds to the indicated mobile device location, access the mobile device policy associated with that space, and transmit an indication of the mobile device policy to the mobile device. The mobile device could then apply the mobile device policy to its own settings, functions, apps, etc. Thus, in a first approach, the server can transmit to a mobile device the applicable mobile device policy but not the entire mobile device map. As a result, in such situations the mobile device might be unable to determine on its own when it has moved to a different space that is associated with a different mobile device policy. Instead, the mobile device could periodically report its current location to the server (optionally with a greater frequency than before). In such instances, the server can then determine from the reported locations whether the mobile device has moved to a different space that is associated with a different mobile device policy and, if so, transmit the new mobile device policy to the mobile device.

In a second approach, the server can transmit the mobile device policy map, or a portion of the mobile device policy map, to the mobile device. In the case that the server sends a portion of the mobile device policy map, the portion could be based on the mobile device's indicated location. For example, the server could determine that the indicated location is within a first space in the mobile device policy map, and transmit a portion of the mobile device policy map that includes the first space. The portion could also include one or more adjacent spaces. When the mobile device receives a policy map (which could be either the entire mobile device policy map or a portion thereof) the mobile device can determine from the policy map which defined space it is in and apply the mobile device policy associated with that space. Further, when the mobile device determines that it has moved to a new location, the mobile device can determine from the policy map whether it has moved from the first space to a second space (in which case, the mobile device would apply the mobile device policy associated with the second space) or whether it is still located within the first space (in which case, the mobile device would continue to apply the mobile device policy associated with the first space). If the mobile device determines that it has moved out of the area covered by its policy map, then the mobile device could query the server for a new policy map.

If the server determines from the indicated location in the mobile device's query that the mobile device is not currently within an area covered by a mobile device policy but is proximate to (within a predetermined distance of) such an area, then the server could send a response that prepares the mobile device for the possibility that it might soon enter the area. If the first approach is used, then the server could instruct the mobile device to report its location more frequently. If the second approach is used, then the server could transmit a policy map for the nearby area to the mobile device. The policy map could be the mobile device policy map for the entire area, or a portion of the mobile device policy map (e.g., the portion that is closest to the mobile device's indicated location). The mobile device can store the policy map and periodically compare its current location to the policy map to determine when it has moved into a defined space that is associated with a mobile device policy.

To apply a mobile device policy, a mobile device could disable one or more features. For example, if a notification policy specifies that audible notifications are not permitted, then the mobile device could automatically mute the mobile device's speaker. If an origination policy specifies that origination of voice calls is not permitted, then the user interface functions on the mobile device that are normally used to dial telephone numbers could be disabled. If an application policy specifies that certain types of applications are not permitted, then one or more applications on the mobile device could be locked. A mobile device could also activate one or more features in order to apply a mobile device policy. For example, if a notification policy specifies that only tactile notifications are permissible, the mobile device could automatically set its notification mode to vibrate. As another example, a notification policy could specify use of an audible notification mode with a relatively high volume level. This type of notification policy could be appropriate in spaces that are typically noisy. To apply this notification policy, the mobile device could automatically set its speaker volume level to the specified high level. Although a mobile device could apply mobile devices policies automatically, the mobile device could allow an authorized user to override certain policies (e.g., using a password).

FIG. 1 is a simplified block diagram of a communication system 100, in which various embodiments described herein could be employed. Communication system 100 includes client devices 102, 104, 106, and 108, which are able to communicate with a mobile device policy system 110 by means of a communication network 112. Mobile device policy system 110 could include, for example, a server 114 and a database 116. Server 114 represents either a single server device or multiple server devices, such as a cluster of server devices. In addition, database 116 represents any number of data storage systems or devices, which could either be integrated into server 114 or remotely located from and communicatively coupled to server 114.

As shown in FIG. 1, client devices 102, 104, 106, and 108 are, respectively, a desktop computer, a cellular telephone, a smartphone, and a tablet computer. It is to be understood, however, that these client devices are merely examples. Other types of client devices could also be able to communicate with mobile device policy system 110 by means of communication network 112. Further, although FIG. 1 shows four client devices, it is to be understood that any number of client devices could be able to communicate with mobile device policy system 110 by means of communication network 112.

In an example embodiment, network 112 uses packet-switching technologies. Thus, network 112 could represent the Internet, or some form of public or private Internet Protocol (IP) network. Alternatively or additionally, network 112 could use circuit-switching technologies. Client devices could communicate with network 112 through the use of wireline connections (indicated by solid lines) and/or wireless connections (indicated by dashed lines).

Mobile device policy system 110 could be used for developing mobile device policies and/or enforcing mobile device policies. With regard to developing mobile device policies, a proprietor of a given property could be able to access mobile device policy system 110 (e.g., using a client device, such as desktop computer 102) to design a mobile device policy map for that given property. For example, mobile device policy system 110 could provide an interactive user interface (e.g., a Web based interface) that allows the proprietor to identify a property, define one or more spaces within the property, and associate a mobile device policy to each defined space. The mobile device policy map designed in this way could then be stored by mobile device policy system 110 (e.g., in database 116) for subsequent enforcement. Alternatively, a proprietor could design a mobile device policy map off-line, i.e., without using mobile device policy system 110, and then upload the mobile device policy map to mobile device policy system 110 for subsequent enforcement.

Once one or more mobile device policies have been developed for a given property, for example, as described above, the policies can be enforced using mobile device policy system 110. Mobile devices that could be subject to enforcement could include, for example, cellular telephones (such as device 104), smartphone (such as device 106), tablet computers (such as device 108), and/or other types of mobile communication devices. In some cases, mobile device policy system 110 could enforce the mobile device policies of a given property for all such mobile devices that operate in the given property. Alternatively, mobile device policy system 110 could enforce mobile device policies for only certain mobile devices that operate in the given property, such as only those mobile devices that have opted in.

The process of enforcing a mobile device policy for a given property could involve communications between mobile device policy system 110 and the mobile devices operating in that property. For example, a mobile device could periodically report its location to server 114. When the reported location is covered by a mobile device policy map, server 114 could send the mobile device the mobile device policy that is associated with that location according to the mobile device policy map. The mobile device could then apply that mobile device policy. Alternatively, server 114 could send the mobile device policy map (or a portion thereof) to the mobile device, and the mobile device could determine which policy to apply by comparing its location to one or more spaces defined in the map.

Figure 2A:
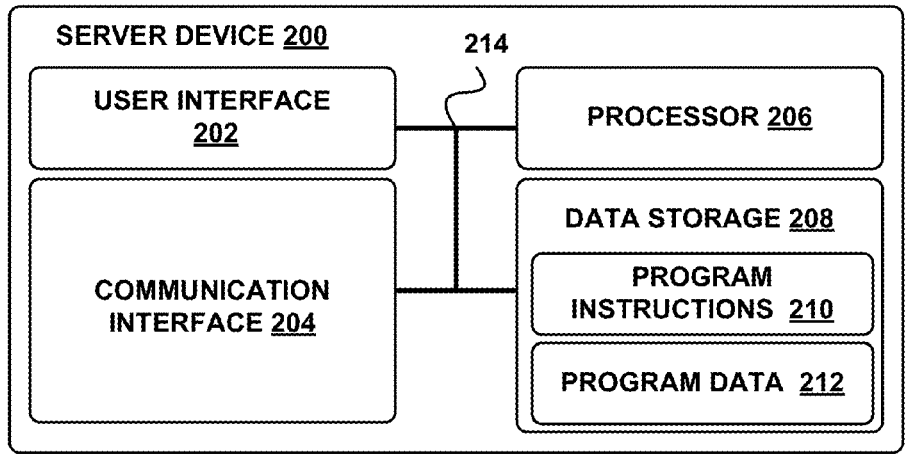
FIG. 2A is a block diagram of a server device, in accordance with an example embodiment.

FIG. 2A is a block diagram of a server device 200 in accordance with an example embodiment. Server device 200 could, for example, correspond to server 114 shown in FIG. 1 or to a component of server 114. In one example, server device 200 includes a user interface 202, a communication interface 204, processor 206, and data storage 208, linked together via a system bus, network, or other connection mechanism 214.

User interface 202 could include one or more user input devices, such as a keyboard, a keypad, a touch screen, a computer mouse, a track ball, a joystick, and/or other similar devices, now known or later developed. User interface 202 could also include one or more display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 could be configured to generate audible output(s), via a speaker, speaker jack, audio output port, audio output device, earphones, and/or other similar devices, now known or later developed. In some embodiments, user interface 202 could include software, circuitry, or another form of logic that can transmit data to and/or receive data from external user input/output devices.

Communication interface 204 could include one or more wireless interfaces and/or wireline interfaces that are configurable to communicate via a network, such as network 112 shown in FIG. 1. The wireless interfaces, if present, could include one or more wireless transceivers, such as a Bluetooth transceiver, a Wifi transceiver configured to operate in accordance with an IEEE 802.11 standard (e.g., 802.11b, 802.11g, 802.11n), a WiMAX transceiver configured to operate in accordance with an IEEE 802.16 standard, a Long-Term Evolution (LTE) transceiver configured to operate in accordance with a 3rd Generation Partnership Project (3GPP) standard, and/or other types of wireless transceivers configurable to communicate via local-area or wide-area wireless networks. The wireline interfaces, if present, could include one or more wireline transceivers, such as an Ethernet transceiver, a Universal Serial Bus (USB) transceiver, or similar transceiver configured to communicate via a twisted pair wire, a coaxial cable, a fiber-optic link or other physical connection to a wireline device or network.

In some embodiments, communication interface 204 could be configured to provide reliable, secured, and/or authenticated communications. For each communication described herein, information for ensuring reliable communications (e.g., guaranteed message delivery) could be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms could be used instead of or in addition to those listed herein to secure (and then decrypt/decode) communications.

Processor 206 could include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 could be configured to execute computer-readable program instructions 210 that are contained in data storage 208, and/or other instructions, to carry out various functions described herein.

Data storage 208 could include one or more non-transitory computer-readable storage media that can be read or accessed by processor 206. The one or more computer-readable storage media could include volatile and/or non-volatile storage components, such as optical, magnetic, organic or other memory or disc storage, which could be integrated in whole or in part with processor 206. In some embodiments, data storage 208 could be implemented using a single physical device (e.g., one optical, magnetic, organic or other memory or disc storage unit), while in other embodiments, data storage 208 could be implemented using two or more physical devices.

Data storage 208 could also include program data 212 that can be used by processor 206 to carry out functions described herein. In some embodiments, data storage 208 could include, or have access to, additional data storage components or devices (e.g., cluster data storages described below).

Server 114 and database 116 could invoke applications and use application data that are stored at various places. These places could be data centers containing numerous servers and databases. The exact physical location, connectivity, and configuration of server 114 and database 116 could be unknown and/or unimportant to client devices. Accordingly, server 114 and database 116 could be referred to as "cloud-based" devices that are housed at various remote locations. One possible advantage of such "could-based" computing is to offload processing and data storage from client devices, thereby simplifying the design and requirements of these client devices.

In some embodiments, server 114 and database 116 could be a single computing device residing in a single data center. In other embodiments, server 114 and database 116 could include multiple computing devices in a data center, or even multiple computing devices in multiple data centers, where the data centers are located in diverse geographic locations. For example, server 114 and database 116 could be in different physical locations.

Figure 2B:
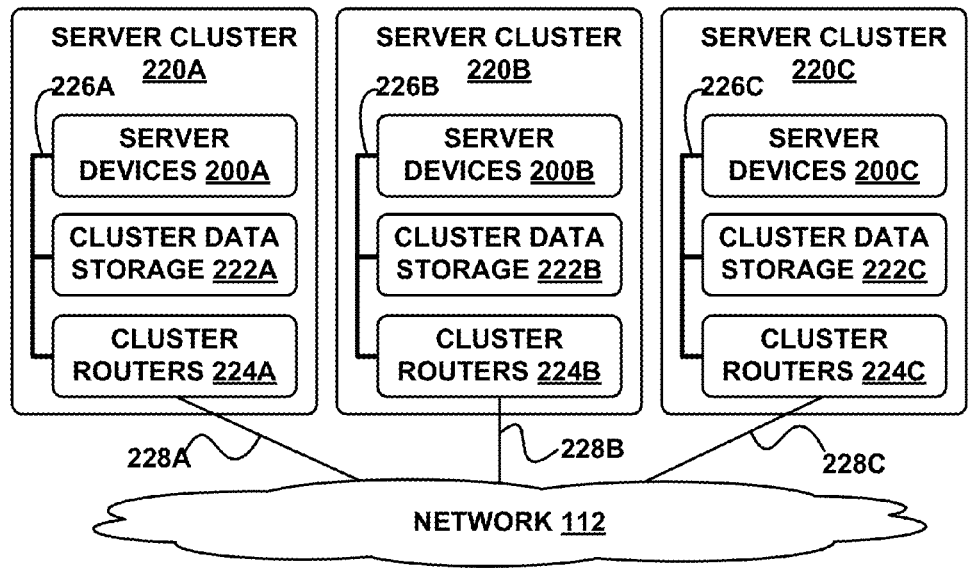
FIG. 2B illustrates a cloud-based server system, in accordance with an example embodiment.

Thus, the functions of server 114 and database 116 could be distributed among one or more server clusters, such as server clusters 220a, 220b, and 220c shown in FIG. 2B. Server cluster 220a could include one or more server devices 200a, cluster data storage 222a, and cluster routers 224a connected by a local cluster network 226a. Similarly, server cluster 220b could include one or more server devices 200b, cluster data storage 222b, and cluster routers 224b connected by a local cluster network 226b. Likewise, server cluster 220c could include one or more server devices 200c, cluster data storage 222c, and cluster routers 224c connected by a local cluster network 226c. Server clusters 220a, 220b, and 220c could communicate with network 108 via communication links 228a, 228b, and 228c, respectively.

In some embodiments, each of the server clusters 220a, 220b, and 220c could have an equal number of server devices, an equal number of cluster data storages, and an equal number of cluster routers. In other embodiments, however, some or all of the server clusters 220a, 220b, and 220c could have different numbers of server devices, different numbers of cluster data storages, and/or different numbers of cluster routers. The number of server devices, cluster data storages, and cluster routers in each server cluster could depend on the computing task(s) and/or applications assigned to each server cluster.

In the server cluster 220a, for example, server devices 200a could be configured to perform various computing tasks of server 114. In one embodiment, these computing tasks could be distributed among one or more of server devices 200a. Server devices 200b and 200c in server clusters 220b and 220c could be configured the same or similarly to server devices 200a in server cluster 220a. On the other hand, in some embodiments, server devices 200a, 200b, and 200c each could be configured to perform different functions. For example, server devices 200a could be configured to perform one or more functions of server 1140, and server devices 200b and server device 200c could be configured to perform other functions. Similarly, the functions of database 116 could be localized to a single server cluster or could be distributed among multiple server clusters.

Cluster data storages 222a, 222b, and 222c of the server clusters 220a, 220b, and 220c, respectively, could be data storage arrays that include disk array controllers configured to manage read and write access to groups of hard disk drives. The disk array controllers, alone or in conjunction with their respective server devices, could also be configured to manage backup or redundant copies of the data stored in cluster data storages to protect against disk drive failures or other types of failures that prevent one or more server devices from accessing one or more cluster data storages.

Similar to the manner in which the functions of server 114 and database 116 could be distributed across server clusters 220a, 220b, and 220c, various active portions and/or backup/redundant portions of these components could be distributed across cluster data storages 222a, 222b, and 222c. For example, some cluster data storages 222a, 222b, and 222c could be configured to store backup versions of data stored in other cluster data storages 222a, 222b, and 222c.

Cluster routers 224a, 224b, and 224c in server clusters 220a, 220b, and 220c, respectively, could include networking equipment configured to provide internal and external communications for the server clusters. For example, cluster routers 224a in server cluster 220a could include one or more packet-switching and/or routing devices configured to provide (i) network communications between server devices 200a and cluster data storage 222a via cluster network 226a, and/or (ii) network communications between the server cluster 220a and other devices via communication link 228a to network 112. Cluster routers 224b and 224c could include network equipment similar to cluster routers 224a, and cluster routers 224b and 224c could perform networking functions for server clusters 220b and 220c that cluster routers 224a perform for server cluster 220a.

Additionally, the configuration of cluster routers 224a, 224b, and 224c could be based at least in part on the data communication requirements of the server devices and cluster storage arrays, the data communications capabilities of the network equipment in the cluster routers 224a, 224b, and 224c, the latency and throughput of the local cluster networks 226a, 226b, 226c, the latency, throughput, and cost of the wide area network connections 228a, 228b, and 228c, and/or other factors that could contribute to the cost, speed, fault-tolerance, resiliency, efficiency and/or other design goals of the system architecture.

Figure 3:
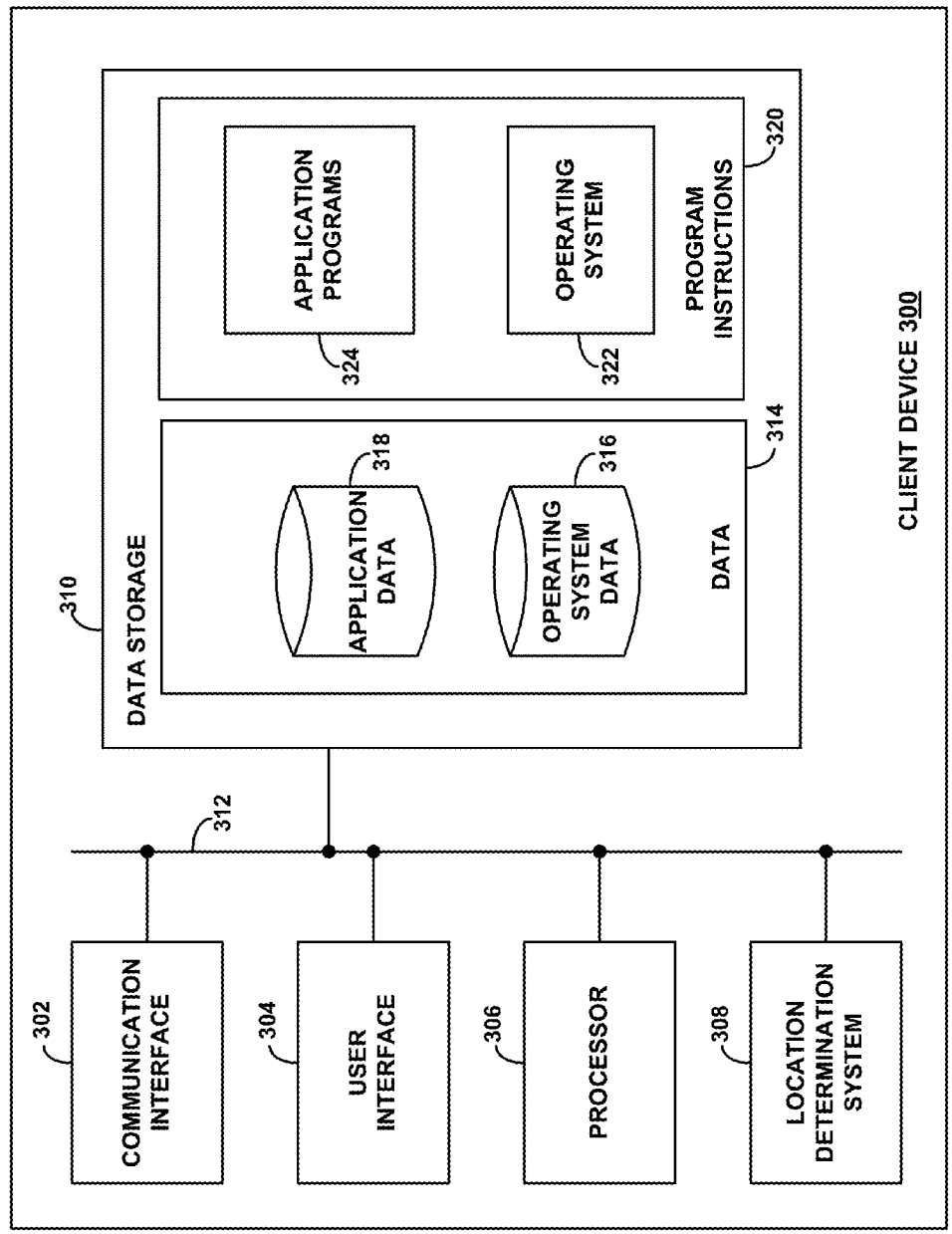
FIG. 3 illustrates an internal configuration of a client device in, accordance with an example embodiment.

FIG. 3 is a simplified block diagram showing some of the components of an example client device 300. Client device 300 could be any device that is able to communicate with server 114 shown in FIG. 1, with server device 200 shown in FIG. 2A, or with any of server clusters 220a, 220b, and 220c shown in FIG. 2B. For example, client device 300 could be a mobile device, such as cellular telephone 104, smartphone 106, or tablet computer 108. Alternatively, client device 300 could be a non-mobile device, such as desktop computer 102.

In one example, client device 300 includes a communication interface 302, a user interface 304, a processor 306, a location determination system 308, and data storage 310, communicatively linked together by a system bus, network, or other connection mechanism 312.

Communication interface 302 enables client device 300 to communicate, using analog or digital modulation, with other devices, access networks, and/or transport networks. Thus, communication interface 302 could facilitate circuit-switched and/or packet-switched communication, such as IP or other packetized communication. For instance, communication interface 302 could include a chipset and antenna arranged for wireless communication with a radio access network or an access point. Alternatively or additionally, communication interface 302 could include a wireline interface, such as an Ethernet, Token Ring, or USB port.

In one example, communication interface 302 is a wireless interface that supports wireless communication with cellular wireless networks, for example, using 3G protocols (such as CDMA, EVDO, UMTS and GSM/GPRS) and/or 4G protocols (such as WiMAX and LTE). Alternatively or additionally, communication interface 302 could support communication with wireless local area networks or personal area networks, for example, using Wifi, Bluetooth, or ZigBee. However, other forms of physical layer interfaces and other types of standard or proprietary communication protocols could be used over communication interface 302.

User interface 304 could function to allow client device 300 to interact with a user, such as to receive input from a user and to provide output to the user. Thus, user interface 304 could include input components such as a keypad, keyboard, touch-sensitive or presence-sensitive panel, computer mouse, trackball, joystick, microphone, still camera and/or video camera. User interface 304 could also include one or more output components such as a display screen (which, for example, could be combined with a touch-sensitive panel), CRT, LCD, LED, a display using DLP technology, printer, light bulb, and/or other similar devices, now known or later developed. User interface 304 could also be configured to generate audible output, via a speaker, speaker jack, audio output port, audio output device, earphones, and/or other similar devices, now known or later developed. In addition, user interface 304 could be configured to generate tactile output, such as a vibration.

Processor 306 could include one or more general purpose processors (e.g., microprocessors) and/or one or more special purpose processors (e.g., DSPs, GPUs, FPUs, network processors, or ASICs). Data storage 310 could include one or more volatile and/or non-volatile storage components, such as magnetic, optical, flash, or organic storage, and could be integrated in whole or in part with processor 306. Data storage 310 could include removable and/or non-removable components.

Data storage 310 could store data 314 and program instructions 320. Data 314 could be used or generated during the execution of program instructions 320. In addition, data 314 could be received by client device 300 or transmitted by client device 300, e.g., through communication interface 302. Data 314 could also be provisioned in data storage 310 using other means. As one example, data 314 could include one or more mobile device policies and/or one or more policy maps that define spaces and associate the defined spaces with mobile device policies.

Generally speaking, processor 306 could be capable of executing program instructions 320 (e.g., compiled or non-compiled program logic and/or machine code) stored in data storage 310 to carry out the various functions described herein. Thus, data storage 310 could include a non-transitory computer-readable medium, having stored thereon program instructions that, if executed by client device 300, cause client device 300 to carry out any of the methods, processes, or functions disclosed in this specification and/or the accompanying drawings. The execution of program instructions 320 by processor 306 could result in processor 306 using data 314.

By way of example, program instructions 320 could include an operating system 322 (e.g., an operating system kernel, device driver(s), and/or other modules) and one or more application programs 324 (e.g., address book, email, web browsing, social networking, and/or gaming applications) installed on client device 300. Similarly, data 314 could include operating system data 316 and application data 318. Operating system data 316 could be accessible primarily to operating system 322, and application data 318 could be accessible primarily to one or more of application programs 324. Application data 318 could be arranged in a file system that is visible to or hidden from a user of client device 300.

Application programs 324 could communicate with operating system 322 through one or more application programming interfaces (APIs). These APIs could facilitate, for instance, application programs 324 reading and/or writing application data 318, transmitting or receiving information via communication interface 302, receiving or displaying information on user interface 304, and so on.

In some cases, application programs 324 could be referred to as "apps" for short. Additionally, application programs 324 could be downloadable to client device 300 through one or more online application stores or application markets. However, application programs could also be installed on client device 300 in other ways, such as via a web browser or through a physical interface (e.g., a USB port) on client device 300.

Location determination system 308 is configured to determine a location of client device 300. For example, location determination system 308 could be able to determine location by receiving wireless signals from a satellite-based position system, such as the global position system (GPS). Thus, location determination system 308 could include a GPS receiver. Alternatively or additionally, location determination system 308 could be able to determine location by receiving wireless signals from terrestrial sources, such as one or more cellular base stations, Wifi access points, Bluetooth transmitters, or infrared transmitters. Thus, location determination system 308 could include a Wifi receiver, a Bluetooth receiver, an infrared receiver, and/or some other type of receiver that is configured to receive wireless signals that could be used for location determination. In some cases, location determination system 308 could determine location using hybrid techniques that make use of wireless signals from both satellite-based and terrestrial sources.

Alternatively or additionally, location determination system 308 could be configured to determination the location of client device 300 using inertial navigation techniques. Thus, location determination system 308 could include one or more motion sensors, such as a gyroscope or accelerometer. In some cases, location determination system 308 could be configured to determine location using motion data in combination with wireless data. For example, location determination system 308 could determine the location of client device 300 at one point in time based on wireless signals and thereafter track the location of client device 300 based on motion data. Other types of location determination methods are possible as well.

Figure 4:
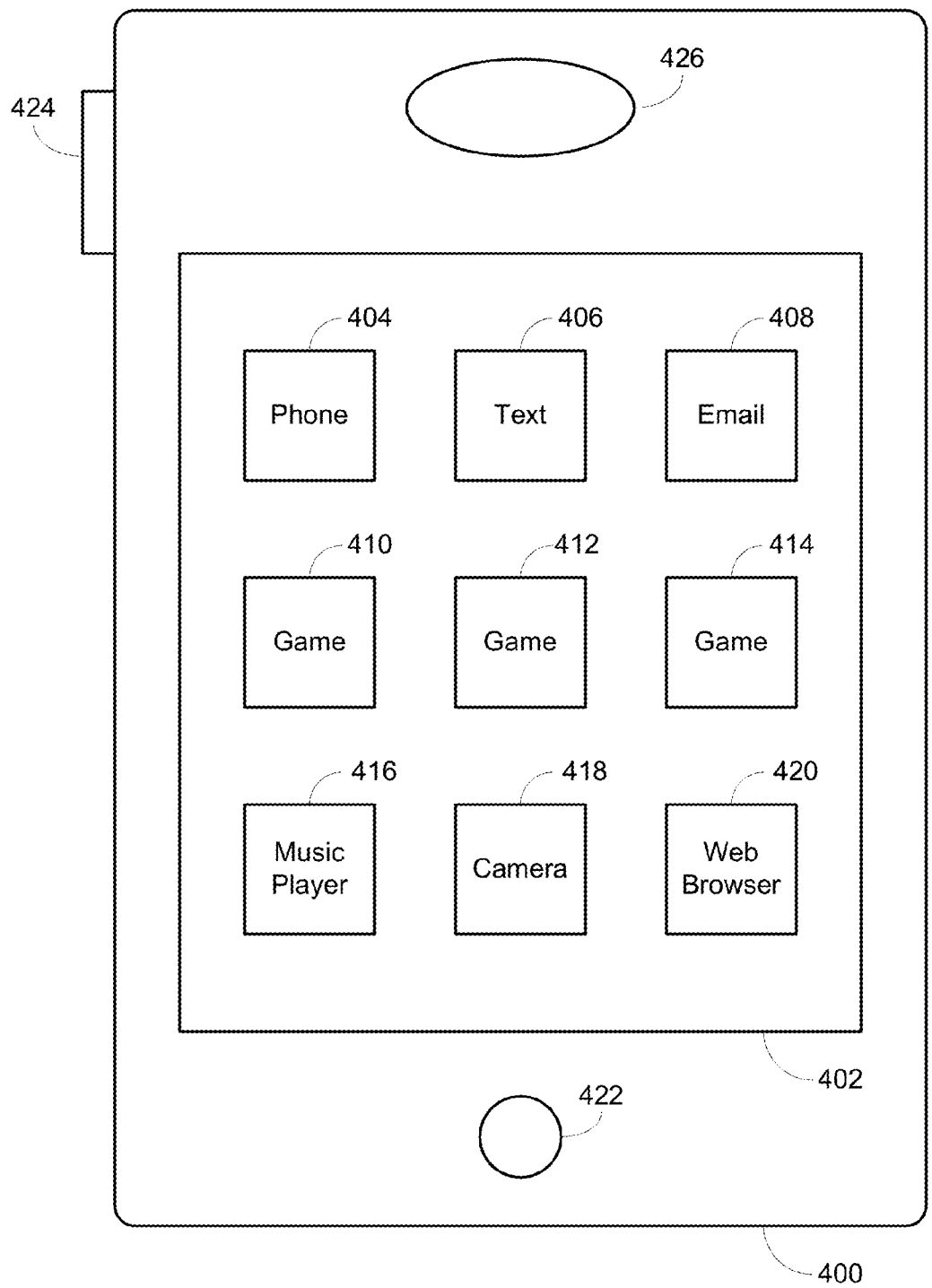
FIG. 4 illustrates an external configuration of a mobile device, in accordance with an example embodiment.

FIG. 4 illustrates an external configuration of an example mobile device 400. In this example, mobile device 400 is a smartphone, such as smartphone 106 in FIG. 1. In addition, mobile device 400 could have an internal configuration as shown in FIG. 3 for client device 300. FIG. 4 is intended to illustrate some of the features that could be available on a mobile device. It is to be understood, however, that other mobile devices could include other or additional features.

In this example, mobile device 400 includes a touch-sensitive display 402. Shown on the display are a number of icons that represent applications that can be invoked by the user, for example, by touching display 402. As shown in FIG. 4, the icons are for a phone application 404, a text application 406, an email application 408, game applications 410-414, a music player 416, a camera application 418, and a web browser 420. It is to be understood that the applications indicated by icons shown in FIG. 4 are merely examples of the applications that could be supported by a mobile device. Thus, a mobile device could include other or additional applications. In addition, such applications could be selected or invoked through other means than a touch-sensitive display.

In addition to touch-sensitive display 402, mobile device 400 could include other components for receiving input from the user. As shown in FIG. 4, mobile device 400 includes a multi-function button 422, through which the user could navigate through the user interface shown in display 402 and/or invoke other functions. Mobile device 400 also includes a volume control 424, through which the user could control the volume level of a speaker 426 on mobile device 400.

Phone application 404 could be used to send and receive voice calls. Text application 406 could be used to send and receive text messages. Email application 408 could be used to send and receive email messages. Game applications 410-414 could be used to play different types of games. The games could include a visual component, which could be displayed on display 402, an audio component, which could be played through speaker 426, and/or a tactile component. Music player 416 could be used to play music, for example, through speaker 426 or through external earphones. Camera application 418 could be invoked to take still images and/or video using mobile device 400. Web browser 420 could be used to access information or resources on the Internet using, for example, the HyperText Transfer Protocol (HTTP).

As noted above, mobile device 400 could be used to originate and to receive various types of communications, such as voice calls, text messages, and email messages. With regard to receiving communications, mobile device 400 could be configured to provide a user-discernible notification when an incoming communication is received. The user-discernible notification could include an audible, visual, and/or tactile component. For example, when an incoming voice call is received, mobile device 400 could be configured to play a ring tone through speaker 426 at a volume level set by volume control 424. In addition, mobile device 400 could display a pop-up notification on display 402. The pop-notification could, for example, identify the caller. Mobile device 400 could also provide a tactile notification, such as a vibration, in response to an incoming call. In addition to incoming voice calls, mobile device 400 could also generate a user-discernible notification (which could be audible, visual, and/or tactile) when mobile device 400 receives incoming text messages, email messages, or other incoming communications.

In some cases, mobile device 400 could include functionality that allows a user to control how mobile device 400 provides notifications in response to incoming voice calls, text messages, email messages, or other communications. For example, volume control 424 could be used to control the volume level at which a ring tone notifications of incoming voice calls are played through speaker 426. In addition, mobile device 400 could include functionality that allows audible notifications to be disabled. Such functionality could further allow a user to select visual and/or tactile notifications of incoming voice calls. The notifications of incoming text messages, email messages, and other communications could be similarly controlled.

However, mobile device 400 could apply a notification policy that overrides, in whole or in part, one or more user preferences. For example, if the user has set a particular volume level for voice call notifications, mobile device 400 could instead apply a notification policy that provides a different volume level for voice call notifications. The notification policy could provide a higher volume level, a lower volume level, or could turn off audible notifications for voice calls altogether. User preferences regarding notifications for incoming text messages, email messages, or other communication could also be overridden by notification policies.

As noted above, phone application 404, text application 406, and email application 408 could be used to originate various types of communications. However, mobile device 400 could apply an origination policy that restricts the usage of such applications to originate communications. For example, an origination policy could prevent phone application 404 from being used to originate voice calls but could still allow text messages to be sent using text application 406 and email messages to be sent using email application 408. Alternatively, an origination policy could prevent all types of communications from being originated from mobile device 400. Other origination policies are also possible.

Mobile device 400 could also apply application policies that restrict the usage of other types of applications, such as games 410-414, music player 416, camera application 418, and web browser 420. For example, an application policy could prevent games 410-414 and music player 416 from being used but could allow the usage of other applications. Other application policies are also possible.

Figure 5:
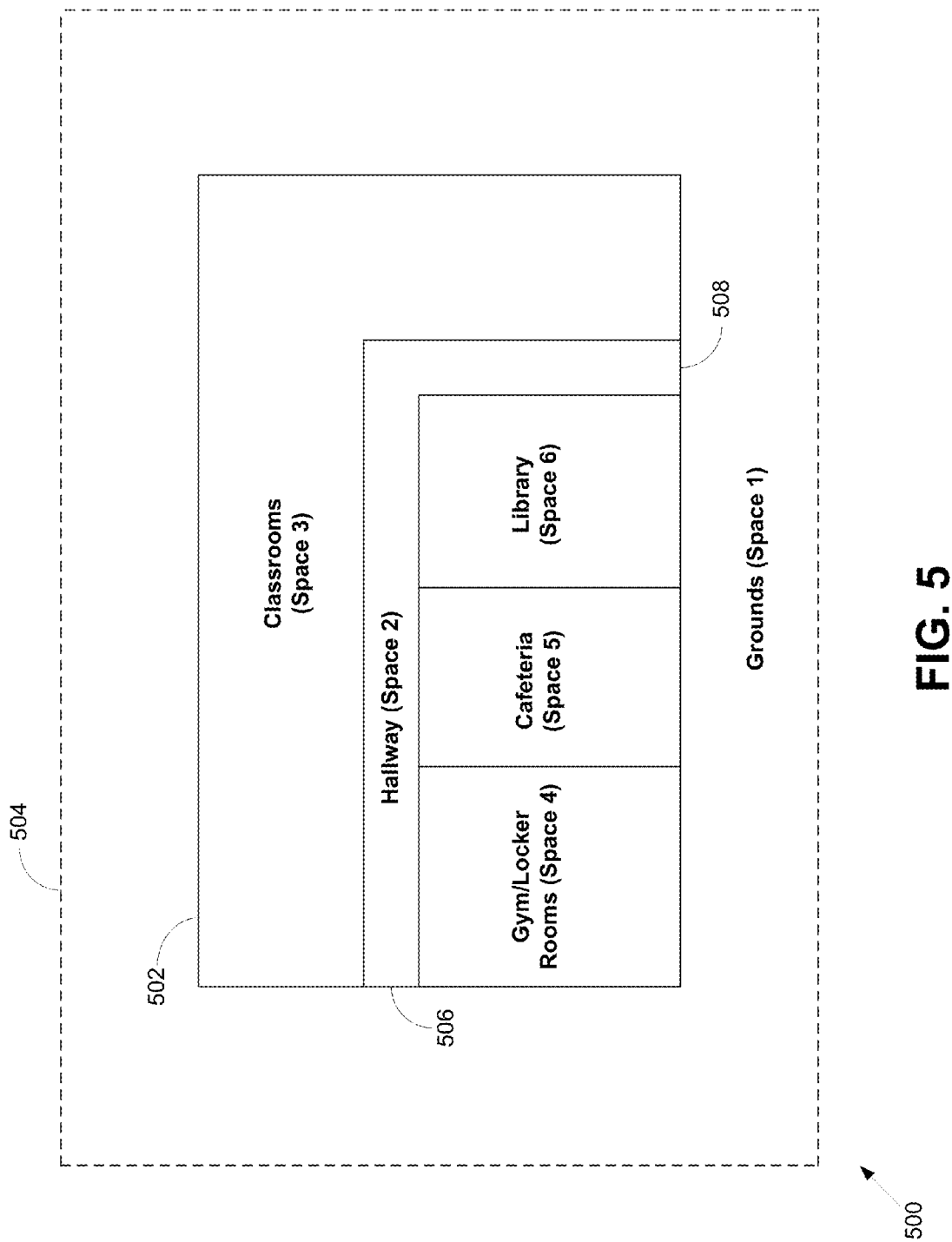
FIG. 5 illustrates spaces within a property, in accordance with an example embodiment.

As noted above, a proprietor who owns, manages, or uses a property could create a mobile device policy map for the property. The mobile device policy map could define one or more spaces within the property and associate the defined spaces with respective mobile device policies. FIG. 5 illustrates an example property 500 in which six spaces are defined in a corresponding mobile device policy map. In this example, property 500 is a school property that includes a building 502 and a grounds area 504. The grounds area 504 is defined as one space (Space 1). The other five defined spaces are in building 502. In particular, building 502 has two entrances 506 and 508, which open into a hallway, which is defined as Space 2. The hallway provides access to a number of classrooms, which are collectively defined as Space 3. In addition, the hallway provides access to a gym and locker rooms, which are defined as Space 4, a cafeteria, which is defined as Space 5, and a library, which is defined as Space 6.

It is to be understood that property 500 shown in FIG. 5 is only one example of a property that could be associated with a mobile device policy map. In addition to educational facilities, mobile device policy maps could be associated with residential properties, commercial properties, non-commercial properties, governmental properties, or properties of any other type. Further, a mobile device policy map could cover indoor spaces (such as a building, part of a building, or multiple buildings), outdoor spaces (such as grounds areas, campus areas, sporting venues, etc.), or a combination of indoor and outdoor spaces.

FIG. 6 illustrates an example mobile device policy map 600 that could be associated with property 500. As shown, mobile device policy map 600 includes for each of Spaces 1 through 6, a definition of the space, a notification policy, an origination policy, and an application policy. In map 600, each space could be defined various ways. In some cases, a space could be defined in terms of its boundaries, for example, using latitude/longitude or other coordinates. For example, Space 6 (the library in building 502) could be defined in terms of the rectangular boundary shown in FIG. 5, and Space 3 (the classrooms in building 502) could be defined in terms of the L-shaped boundary shown in FIG. 5.

Alternatively, a space could be defined in terms of the wireless signals that are receivable in that space. The wireless signals could be from communication systems that are used in that space, such as Wifi access points or Bluetooth transmitters. However, the wireless signals could also be "beacon" signals that are used to identify the locations to mobile devices. Thus, Space 6 could be defined based on the wireless signals that are present in the library and Space 3 could be defined based on the wireless signals that are present in the classrooms, instead of or in addition to their physical boundaries.

In some cases, spaces could be defined relative to "landmarks" or other reference points. For example, entrances 506 and 508 in building 502 could be reference points that are identifiable by wireless beacons. The spaces inside the building (Spaces 2 through 6) could then be defined based on their locations relative to entrances 506 and 508. Spaces in a mobile device policy map could be defined in still other ways as well.

As noted above, each of Spaces 1 through 6 is associated with a notification policy in mobile device policy map 600. The notification policy specifies how two classes of mobile devices (Class A and Class B) are permitted to provide notifications in response to incoming communications. In this example, the "Class A" mobile devices are mobile devices that are used by teachers or other staff of school property 500, whereas the "Class B" mobile devices are mobile devices used by students.

It is to be understood that these classes are merely representative examples, as other mobile device classes could be defined. As one example, the mobile devices of visitors could be defined as an additional class with its own set of notification policies. Alternatively, the mobile devices of visitors could be considered to be in either Class A or Class B, or could be exempt from the mobile device policies altogether. As another example, the mobile devices used by certain staff, such as maintenance staff or security staff could be placed in a special classification, which could be subject to yet another set of notification policies or could be entirely exempt from the notification policies in mobile device policy map 600. Still other mobile device classifications could be defined.

For each space defined in mobile device policy map 600, the notification policy specifies whether audible, tactile, and visual notifications are permitted (as indicated by a "YES") or not permitted (as indicated by a "NO") for Class A and Class B mobile devices. Further, the notification policy could specify one or more qualifications regarding whether a certain type of notification is permitted or not permitted. For example, a notification policy that permits audible notifications could include a qualification that the volume level is required to be below a certain level. A notification policy could also include qualifications regarding when the policy applies (i.e., the notification policy could depend on the time of day and/or the day of the week). Other qualifications are also possible.

The notification policies for the spaces defined in mobile device policy map 600 could be set based on considerations of how the spaces are intended to be used and/or the expected noise levels in the spaces. Thus, the notification policy for the grounds area (Space 1) specifies that audible, tactile, and visual notifications are all permitted for Class A and Class B mobile devices. Similarly, the notification policy for the hallway (Space 2) specifies that audible, tactile, and visual notifications are all permitted for Class A and Class B mobile devices, but with the qualification that audible notifications must be at a low volume level (e.g., a volume level that does not exceed a defined level).

However, the notification policy for the classrooms (Space 3) is much more restrictive. For Class A mobile devices, the policy specifies that tactile and visual notifications are permitted, but audible notifications are not. For Class B mobile devices, the policy specifies that audible, tactile, and visual notifications are all impermissible (e.g., so that students will not be distracted while in class).

The notification policy for the gym/locker room area (Space 4) is somewhat less restrictive, allowing tactile and visual notifications, but not audible indications, for both Class A and Class B mobile devices.

The notification policy for the cafeteria (Space 5) specifies that audible, tactile, and visual notifications are all permitted for Class A and Class B mobile devices. In addition, the policy specifies that audible indications for Class A mobile devices are to be at a high volume (above a defined level), e.g., based on the high noise level that is typical in the cafeteria.

Finally, the notification policy for the library (Space 6) allows for only quiet notifications. Thus, the policy specifies that tactile and visual notifications are permitted but audible notifications are not, for both Class A and Class B mobile devices.

It is to be understood that the set of notification policies in mobile device policy map 600 is merely one example of how notification policies could be defined for one particular type of property. The notification policies for the spaces in property 500 could be defined differently than what is shown in FIG. 6. In addition, the notification policies could be defined for a greater or fewer number of mobile device classes and/or a greater or fewer number of notification types. It is also to be understood that while the notification policies in mobile device policy map 600 treat notifications for incoming voice calls, text messages, and email messages in the same way, different notifications policies could be defined for different types of incoming communications.

In addition to notification policies, mobile device policy map 600 includes an origination policy and an application policy for each of Spaces 1 through 6. In this example, the origination policy specifies whether origination of voice calls or text messages is permitted, and the application policy specifies whether use of music applications (such as music player 416), game applications (such as games 410-414), or camera applications (such as camera application 418) is permitted. In other examples, an origination policy could cover other types of messages and an application policy could cover other types of applications. Further, an origination or application policy could include qualifications regarding what is or is not permitted. As one example, an origination policy that specifies that voice calls are not permitted might still allow the mobile device to make certain types of voice calls, such as emergency calls. As another example, an application policy could permit use of a music player application on a mobile device, but only if external earphones are used (i.e., the mobile device's integrated speaker could be disabled). In yet another example, an application policy could allow a camera application to be used, but only if a flash device is not used. Other qualifications are possible as well.

As with the notification policies, the origination policy and application policy for a given space could be set based on the intended use of the space and/or based on the expected noise level in that space. Thus, in the grounds area (Space 1), the origination policy specifies that origination of both voice calls and text messages is permitted for Class A and Class B mobile devices, and the application policy specifies that use of music, game, and camera applications are permitted for Class A and Class B mobile devices.

The origination policy for the hallway (Space 2) is similar, except that the Class B mobile devices (i.e., students) are not permitted to originate voice calls. The application policy for the hallway, however, is more restrictive. The application policy specifies that camera applications are permitted, but music and game applications are not permitted, for both Class A and Class B mobile devices.

Even more restrictive are the origination policy and application policy for the classrooms (Space 3). The origination policy specifies that the origination of voice calls and text messages is not permitted for Class A and Class B mobile devices. The application policy specifies that music and game applications are not permitted for Class A and Class B mobile devices. The application policy further specifies that camera applications are permitted for Class A mobile devices (i.e., teachers) but not Class B mobile devices (i.e., students).

In the gym/locker room areas (Space 4), the origination policy specifies that text messaging is permitted for both Class A and Class B mobile devices. However, voice calls are permitted for Class A mobile devices but not Class B mobile devices. The application policy for Space 4 specifies that music, game, and camera applications are not permitted for both Class A and Class B mobile devices.

In the cafeteria (Space 5), the origination policy and application policy are not restrictive. The origination policy specifies that both voice calls and text messaging are permitted for Class A and Class B mobile devices. The application policy specifies that music, game, and camera applications are all permitted, for both Class A and Class B mobile devices.

The origination policy and application policy for the library (Space 6) are intended to maintain a quiet atmosphere there. Thus, the origination policy specifies that text messages are permitted, but not voice calls, for both Class A and Class B mobile devices. The application policy specifies that camera applications are permitted, but not music or game applications, for both Class A and Class B mobile devices.

It is to be understood that the origination policies and application policies shown in FIG. 6 are merely exemplary. The mobile delivery policy map for property 500 could include other or different origination policies and/or application policies. In addition, although mobile device policy map 600 includes three types of policies, i.e., notification, origination, and application policies, it is to be understood that a mobile device policy map could include a greater or fewer number of policy types. For example, a mobile device policy map might include notification policies, but not origination or application policies. Other arrangements are also possible.

As described in more detail below, when a mobile device enters or comes near to property 500, the mobile device can receive a policy map that covers one or more spaces in property 500. The policy map could correspond to mobile device policy map 600 in its entirety. Alternatively, the policy map could include only a portion of mobile device policy map 600. For example, FIG. 6A illustrates a policy map 602 that includes the definitions of Spaces 1 through 6 and the notification, origination, and application policies for those spaces that apply to Class B mobile devices, as set forth in mobile device policy map 600. Thus, policy map 602 could be sent to a Class B mobile device when the mobile device enters or comes near to property 500.

The mobile device could then apply the policies in policy map 602 based on its location. Thus, when the mobile device determines that it is in the grounds area (Space 1), e.g., by using GPS, the mobile device applies the notification, origination, and application policies that are associated Space 1. When the mobile device determines that it is in the hallway (Space 2), e.g., by detecting a wireless beacon at entrance 508, the mobile device applies the notification, origination, and application policies that are associated Space 2. When the mobile device determines that it is in a classroom (Space 3), e.g., by detecting a wireless signal associated with the classroom or by referring to movement data that indicates where the device has moved since detecting the wireless beacon at entrance 508, the mobile device applies the notification, origination, and application policies that are associated Space 3. In this way, the mobile device can automatically apply the policies that have been defined for the different spaces in property 500.

Although property map 602 in FIG. 6A includes the policies for all of the spaces in property 500, it is to be understood that a mobile device could receive a policy map that covers only some of the spaces. For example, when a mobile device enters or comes near to grounds area 504, the mobile device could receive a policy map that covers only Space 1. However, when the mobile device reports a location that is inside of building 502, or reports a location that is outside of building 502 but near entrance 506 or 508, the mobile device could receive a policy map that covers one or more spaces inside of building 502 (e.g., one or more of Spaces 2 through 6). Other scenarios are possible as well.

Figure 7:
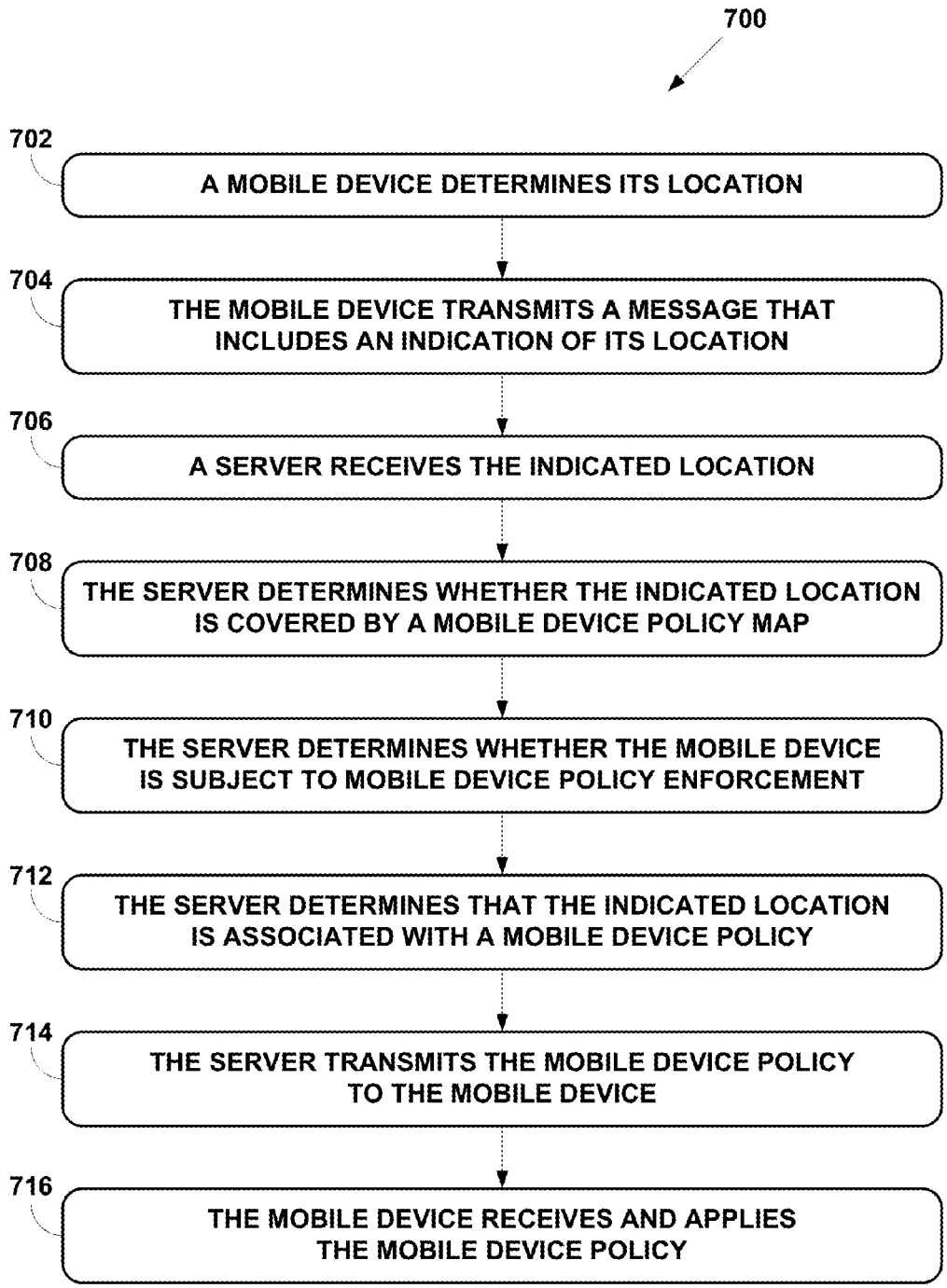
FIG. 7 is a flow chart of a method, in accordance with an example embodiment.

FIG. 7 is a flow chart of a method 700, in accordance with a first example approach. Method 700 could involve systems, network, and devices that are configured as shown in FIGS. 1-4 and described above, or configured in some other way. Further, for purposes of illustration, method 700 will be described with respect to property 500 shown in FIG. 5 and with respect to mobile device policy map 600 shown in FIG. 6. It is to be understood, however, that method 700 could be performed using other properties and/or other mobile device policy maps.

In method 700, a mobile device (e.g., mobile device 400) determines its location, as indicated by block 702. The mobile device could determine its location using, for example, GPS, wireless signals from terrestrial sources, movement data, or by some other means. For example, the mobile device could include a location determination system as shown in FIG. 3 and described above. Further, the mobile device could perform this step either automatically (e.g., the mobile device might be configured to determine its location every 10 seconds) or in response to user input or other triggering event.

After determining its location, the mobile device transmits a message that includes an indication of its determined location, as indicated by block 704. The location indication could be in the form of latitude/longitude coordinates, a street address, or in some other format. The message could also include other information, such as a timestamp, information identifying the mobile device, such as the device's mobile directory number (MDN), and/or information identifying the user of the mobile device, such as the user's name or network access identifier (NAI), and authentication information.

The message transmitted by the mobile device could be a query that seeks to determine whether the indicated location is associated with a mobile device policy. Alternatively, the message could be simply a report of the mobile device's location. For example, the mobile device could be configured to report its location periodically (e.g., every 10 seconds).

A server (e.g., server 114) receives the indicated location, as indicated by block 706. In this example, the server is involved in the enforcement of mobile device policies for multiple properties, with each property having an associated mobile device policy map.

The server determines whether the indicated location is covered by a mobile device policy map, as indicated by block 708. To do this, the server could determine whether the indicated location is within the boundaries of any of the properties for which the server is tasked with mobile device policy enforcement. If the indicated location is within the boundaries of such a property, then the server refers to that property's associated mobile device policy map.

The server could also determine whether the mobile device is subject to mobile device policy enforcement, as indicated by block 710. This could involve a determination of whether the mobile device has opted into the mobile device policy enforcement service and/or whether the mobile device is within a class of mobile devices for which the relevant mobile device policy map has policies. To make this determination, the server could take into account the identity of the mobile device and/or the identity of the mobile device's user, for example, based on information contained in the message of block 704.

In this example, it is assumed that the mobile device's indicated location is within a property that is associated with a mobile device policy map and that the mobile device is subject to mobile device policy enforcement. Thus, the server determines that the indicated location is associated with a mobile device policy, as indicated by block 712. For example, the server could determine that the mobile device's indicated location corresponds to a particular space that is defined in the relevant mobile device policy map and then refer to a mobile device policy that is associated with that particular space (possibly taking into account the mobile device's classification, as well).

The server then transmits the mobile device policy to the mobile device, as indicated by block 714. The transmission could also include instructions to the mobile device that facilitate the enforcement of the mobile device policies in the mobile device policy map. For example, the server could instruct the mobile device to report its location more frequently, or to report its location when it has moved by a certain amount.

The mobile device receives and applies the mobile device policy, as indicated by block 716. Thus, if the mobile device policy includes a notification policy regarding permissible notifications to incoming communications, the mobile device could override any current user settings or preferences and provide only those notifications that are permissible under the policy. Further, if the mobile device policy includes an origination policy and/or application policy, the mobile device could restrict usage of communication applications or other applications so as to conform to the mobile device policy.

The mobile device could continue to apply the mobile device policy until it receives an indication from the server that the mobile device policy no longer applies or that a different mobile device policy applies. The mobile device could receive such an indication in response to reporting an updated location. In this way, a mobile device could determine whether its current location is associated with a mobile device policy by reporting its current location to a server that is involved in mobile device policy enforcement.

For example, with reference to FIG. 5, a user carrying a mobile device might enter grounds area 504 (Space 1) of property 500. The mobile device could report a location that is within Space 1 and receive a mobile device policy that is associated with that space (e.g., in accordance with mobile device policy map 600 shown in FIG. 6). The mobile device could continue moving within grounds area 504 and report its location periodically. At some point, the mobile device might be carried into building 502 through entrance 508. The mobile device could report a location that is within Space 2 (the hallway) and receive a mobile device policy that is associated that space. Subsequently, the mobile device might be carried into the classrooms (Space 3), the gym or locker room (Space 4), the cafeteria (Space 5), or the library (Space 6), in which case the mobile device could report a location that corresponds to that space and receive the associated mobile device policy.

Figure 8:
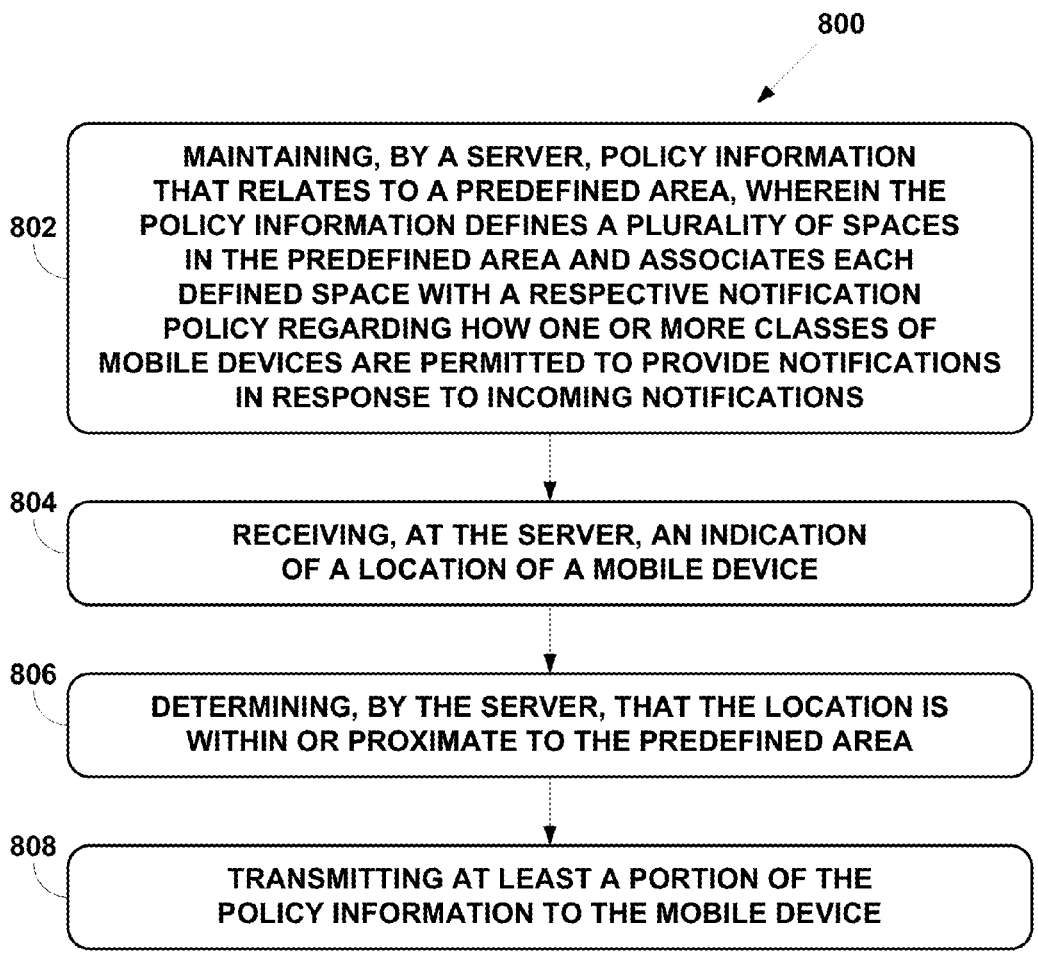
FIG. 8 is a flow chart of a method, in accordance with an example embodiment.
Figure 9:
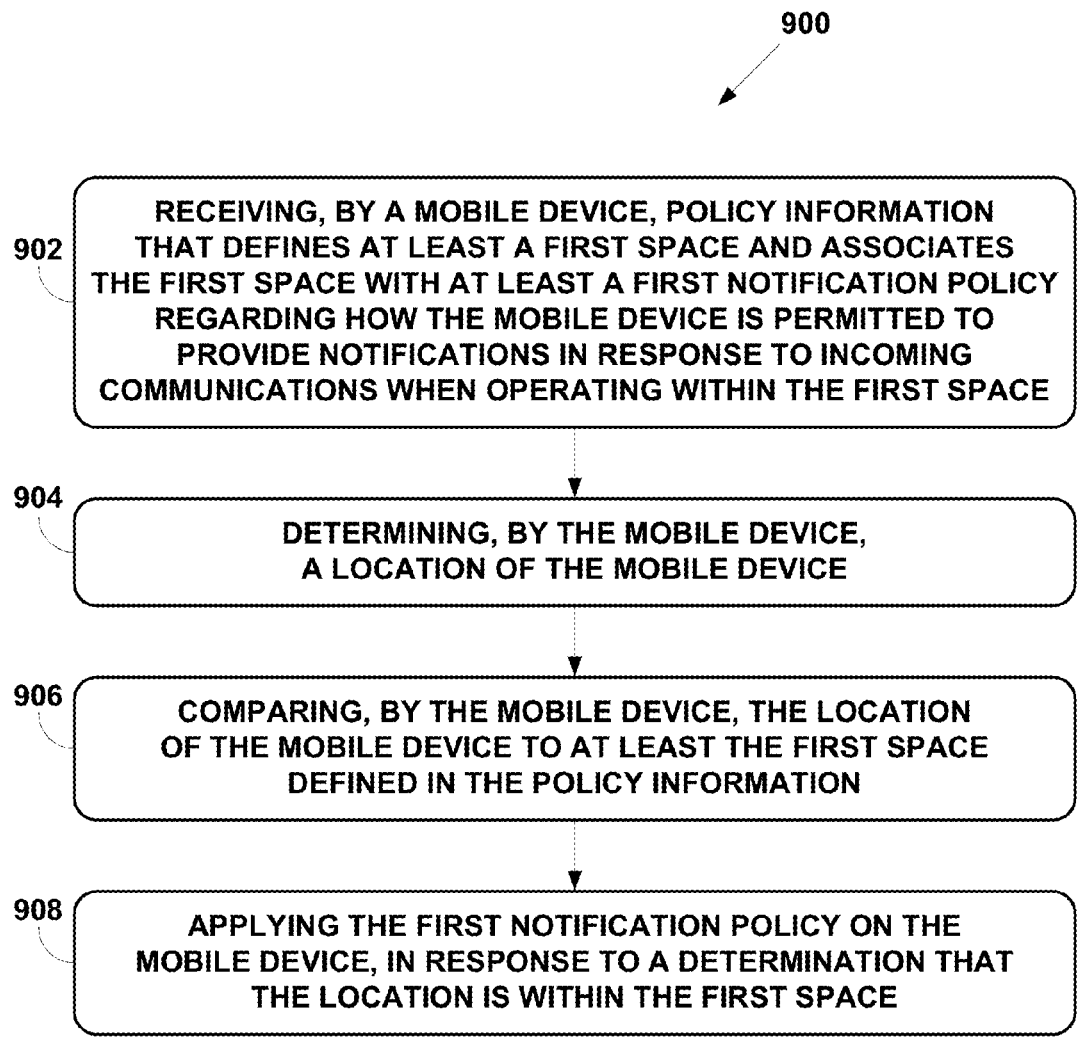
FIG. 9 is a flow chart of a method, in accordance with an example embodiment.

FIGS. 8 and 9 are flow charts that illustrate methods 800 and 900, in accordance with a second example approach. Methods 800 and 900 could involve systems, network, and devices that are configured as shown in FIGS. 1-4 and described above, or configured in some other way. Further, for purposes of illustration, methods 800 and 900 will be described with respect to property 500 shown in FIG. 5, with respect to mobile device policy map 600 shown in FIG. 6, and with respect to policy map 602 shown in FIG. 6A. It is to be understood, however, that methods 800 and 900 could be performed using other properties and/or other policy maps.

Method 800 relates to functions that could be performed by a server (e.g., server 114) as part of a mobile device policy enforcement process, whereas method 900 relates to functions that could be performed by a mobile device (e.g., mobile device 400) as part of the mobile device policy enforcement process.

As part of method 800, policy information that relates to a predefined area is maintained by a server, as indicated by block 802. The policy information defines a plurality of spaces in the predefined area and associates each defined space with a respective notification policy regarding how one or more classes of mobile devices are permitted to provide notifications in response to incoming communications. The policy information maintained by the server could be in the form of, or include, a mobile device policy map, such as map 600 shown in FIG. 6.

The policy map information could be defined by the proprietor of the property that is covered by the mobile device policy map. The proprietor could be any person or entity that owns, uses, or manages the property. The property could include one or more indoor spaces and/or one or more outdoor spaces. Thus, the property could include a building, and one or more of the spaces defined by the policy information could correspond to one or more of the rooms in the building.

Method 800 includes receiving, at the server, an indication of a location of mobile device, as indicated by block 804. The indicated location could be part of a message transmitted by the mobile device, as described above for FIG. 7. Thus, in addition to receiving the mobile device's location, the server could also receive other information included in the mobile device's message, such as information identifying the mobile device and/or information identifying the user of the mobile device.

Method 800 further involves determining, by the server, that the location is within or proximate to (e.g., within a predefined distance of) the predefined area, as indicated by block 806.

Method 800 further involves transmitting at least a portion of the policy information to the mobile device, as indicated by block 808. In some examples, the server could determine that the mobile device has opted in to a service associated with the mobile device policy map or is otherwise subject to mobile device policy enforcement before transmitting the policy map.

The portion that is transmitted to the mobile device could be determined based on the policy information in various ways. In one example, the one or more classes of mobile devices that are the subject of the policy information could include a first class of mobile devices that are subject to a first set of notification policies and a second class of mobile devices that are subject to a second set of notification policies. In that case, the server could determine that the mobile device is in the first class of mobile devices and include the first set of notification policies but not the second set of notification policies. For example, policy map 602 in FIG. 6A is a portion of mobile device policy map 600 that includes only those policies of mobile device policy map 600 that apply to Class B mobile devices.

It is to be understood, however, that the portion transmitted to the mobile device does not necessarily include all of the spaces that are defined in the policy information. Instead, the transmitted portion might include only one or more spaces that are closest to the mobile device's indicated location.

For example, when the mobile device's indicated location is within or proximate to (e.g., within a predefined distance of) a first space that is defined by the policy information, the portion that is transmitted to the mobile device could include a definition of the first pace and a first notification policy regarding how the mobile device is to provide notifications in response to incoming communications when operating with the first space. The first notification policy could specify that audible notifications are permissible in response to incoming communications and could specify a maximum volume level for audible notifications. Alternatively, the first notification policy could specify that audible notifications are not permissible in response to incoming communications but specify that tactile notifications and/or visible notifications are permissible. The first notification policy could include other specifications regarding permissible or impermissible notifications as well.

In some examples, the transmitted portion could further comprise a first origination policy regarding what communications the mobile device is permitted to originate when operating within the first space. The first origination policy could specify that voice calls are or are not permissible. The first origination policy could specify that text message is or is not permissible. The first origination policy could include other specifications regarding permissible or impermissible originations as well.

In some examples, the transmitted portion could further comprise a first application policy regarding what applications can be used when the mobile device is operating within the first space. Examples of such application policies are described above for FIG. 6.

The portion of the policy information that is transmitted to the mobile device could also comprise a definition of a second space (which could be adjacent to the first space) and a second notification policy, second origination policy, and/or second application policy for the second space. The one or more policies associated with the second space could be either the same as or different from the corresponding policies associated with the first space.

On the other hand, if the portion transmitted to the mobile device does not cover the second space, the server could subsequently transmit to the mobile device an additional portion of the policy information that does cover the second space. For example, the server could receive an indication of a new location of the mobile device, wherein the new location is within or proximate to the second space (as defined in the policy information). In response, the server could transmit an additional portion of the policy information to the mobile device, wherein the additional portion comprises a definition of the second space and a second notification policy, second origination policy, and/or second application policy associated with the second space.

Method 900 shown in FIG. 9 relates to functions that are performed by a mobile device, for example, in conjunction with method 800 shown in FIG. 8 or in conjunction with a different method.

Method 900 involves receiving, at a mobile device, policy information that defines at least a first space and associates the first space with at least a first notification policy regarding how the mobile device is permitted to provide notifications in response to incoming communications when operating within the first space, as indicated by block 902. In some examples, the policy information could also associate the first space with a first origination policy regarding what communications the mobile device is permitted to originate when operating within the first space (e.g., as described below with reference to FIG. 10). In some examples, the policy information could also associate the first space with a first application policy regarding what applications the mobile device is permitted to use when operating within the first space (e.g., as described below with reference to FIG. 11).

The policy information could further define a second space (which could be adjacent to the first space) and associate the second space with a second notification policy regarding how the mobile device is permitted to provide notifications in response to incoming communications when operating within the first space. The policy information could also associate the second space with a second origination policy regarding what communications the mobile device is permitted to originate when operating in the second space and/or a second application policy regarding what applications the mobile device is permitted to use when operating in the second space. In general, the policy information could define multiple spaces and associate each defined space with a respective notification policy, origination policy, and/or application policy. Policy map 602 in FIG. 6A is an example of policy information that could be received at a mobile device.

The policy information could be received by the mobile device as a result of a process initiated by the mobile device transmitting an indication of its location, for example, as described above for FIG. 7. Alternatively, the policy information could be received by the mobile device as a result of other actions. For example, the mobile device could be pre-loaded with policy information for one or more properties where the mobile device might operate. Thus, if the user of the mobile device is a student, the mobile device could be pre-loaded with policy information for the student's school.

At some point, the mobile device determines its location, as indicated by block 904. The mobile device then compares its determined location to at least the first space defined in the policy information, as indicated by block 906. If the mobile device determines that the location is within the first space, then the mobile device applies the first notification policy, as indicated by block 908. In examples in which the policy information also includes a first origination policy for the first space, the mobile device could also apply the first origination policy. In examples in which the policy information also includes a first application policy for the first space, the mobile device could also apply the first application policy.

Figure 10:
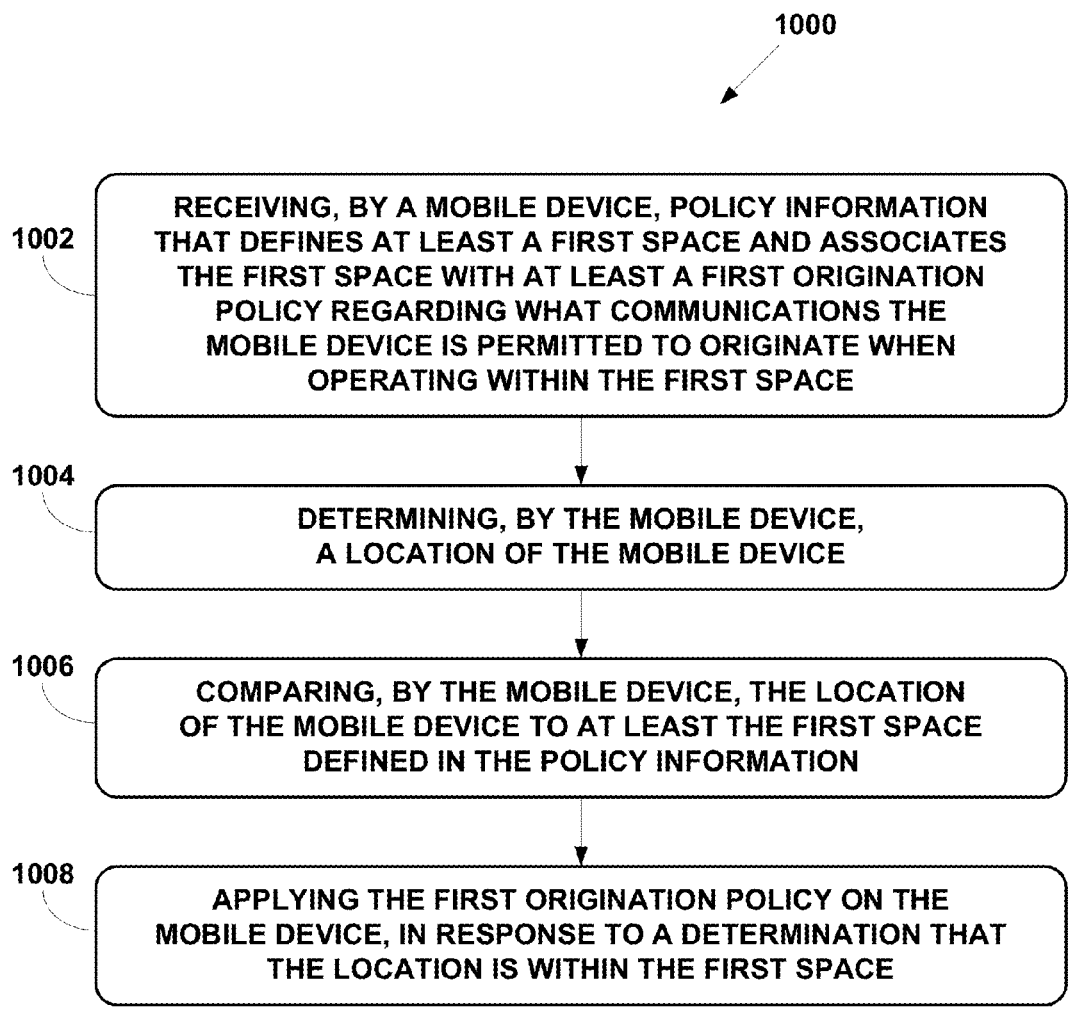
FIG. 10 is a flow chart of a method, in accordance with an example embodiment.

Method 1000 shown in FIG. 10 relates to functions that are performed by a mobile device for an example in which the policy information associates the first space with a first origination policy. At block 1002, the mobile devices receives policy information that defines at least a first space and associates the first space with at least a first origination policy regarding what communications the mobile device is permitted to originate when operating within the first space. The policy information could also include a first notification policy and/or a first application policy for the first space. In addition, the policy information could also include notification, origination, and/or application policies for one or more additional spaces. At block 1004, the mobile device determines its location. At block 1006, the mobile device compares its location to at least the first space defined in the policy information. At block 1008, in response to a determination the location is within the first space, the mobile device applies the first origination policy. The mobile device could also apply a first notification policy and/or first application policy, if defined in the policy information for the first space.

Figure 11:
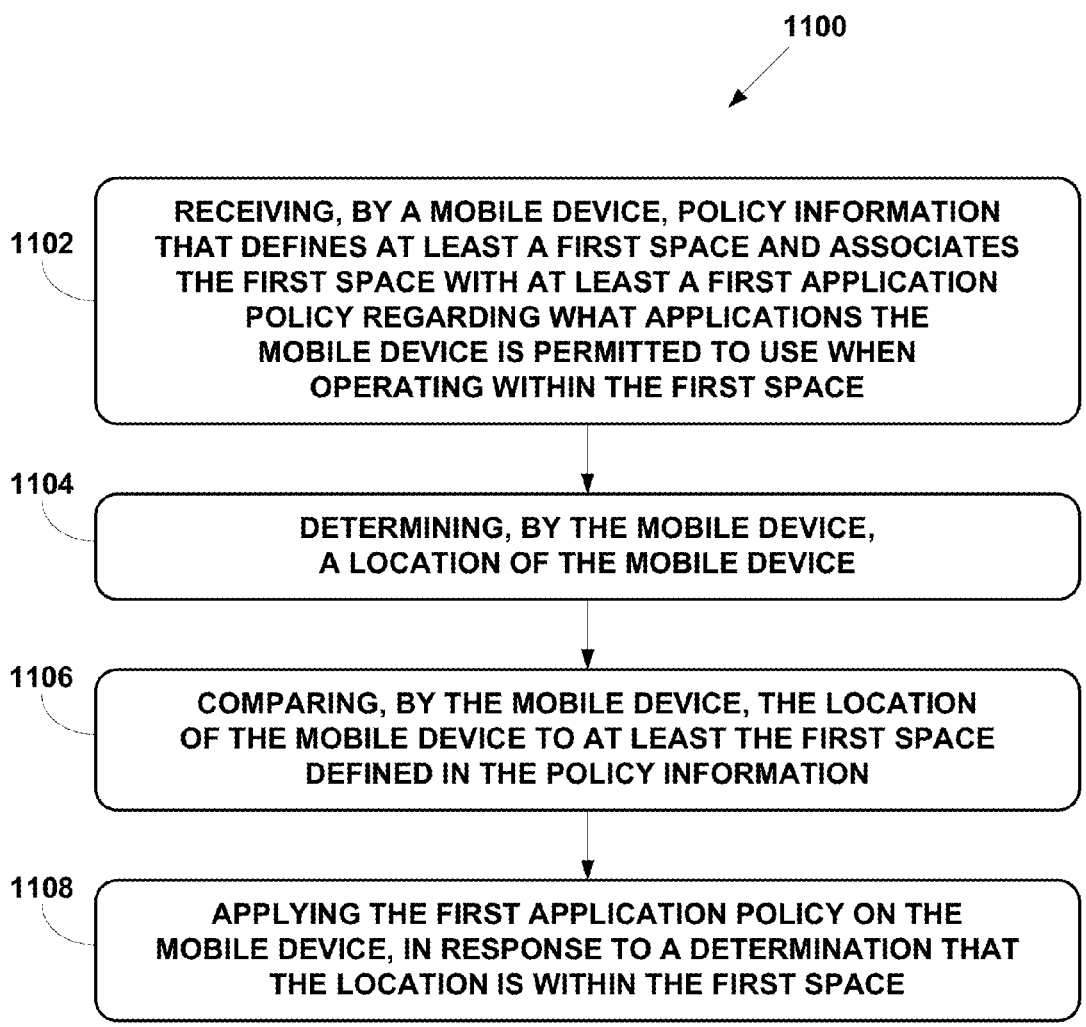
FIG. 11 is a flow chart of a method, in accordance with an example embodiment.

Method 1100 shown in FIG. 11 relates to functions that are performed by a mobile device for an example in which the policy information associates the first space with a first application policy. At block 1102, the mobile devices receives policy information that defines at least a first space and associates the first space with at least a first application policy regarding what applications the mobile device is permitted to use when operating within the first space. The policy information could also include a first notification policy and/or a first origination policy for the first space. In addition, the policy information could also include notification, origination, and/or application policies for one or more additional spaces. At block 1104, the mobile device determines its location. At block 1106, the mobile device compares its location to at least the first space defined in the policy information. At block 1108, in response to a determination the location is within the first space, the mobile device applies the first application policy. The mobile device could also apply a first notification policy and/or first origination policy, if defined in the policy information for the first space.

The mobile device could perform the functions of determining its location, comparing its location to at least the first space, and applying a first notification policy, first origination policy, and/or first application policy in response to a determination that its location is within the first space (e.g., blocks 904 through 908 in FIG. 9) repetitively, in order to apply different policies in different locations. For example, the mobile device could, at some point, determine that it is at a new location and compare that new location to the first space defined in the policy map. If the mobile device determines that the new location is within the first space, the mobile device could continue to apply the one or more policies associated with the first space (e.g., first notification policy, first origination policy, and/or first application policy). On the other hand, if the mobile device determines that the new location is not within the first space, the mobile device could take some additional action to determine whether to apply a different policy or policies, such as one or more policies associated with a different space that is defined in the policy information.

For example, the policy information could define a second space and associate the second space with a second notification policy, a second origination policy, and/or a second application policy. In that case, the mobile device could compare the new location to the second space defined in the policy information. If the mobile device determines that the new location is within the second space, the mobile device could apply the policy or policies associated with the second space instead of the policy or policies associated with the first space.

Alternatively, the mobile device could transmit an indication of its new location and receive new policy information. The new policy information could define at least a second space and associate the second space with a second notification policy, a second origination policy, and/or a second application policy. The mobile device could compare the new location to the second space defined in the new policy information. If the mobile device determines that the new location is within the second space, the mobile device could apply the policy or policies associated with the second space instead of the policy or policies associated with the first space.

For example, with reference to FIG. 5, a user carrying a mobile device might enter grounds area 504 (Space 1) of property 500. The user's mobile device could report a location that is within Space 1 and receive policy information that covers the entire property, such as policy map 602 shown in FIG. 6A. The mobile device could determine that its location corresponds to Space 1 (based on the definition of Space 1 contained in the policy map) and apply the policies associated with Space 1. As the mobile device continues moving within grounds area 504, the mobile device could continue checking its location to find that it is still in Space 1. At some point, the user might enter building 502 through entrance 508. At that point, the user's mobile device could determine a new location and determine that the new location is within Space 2 (the hallway) defined in the policy map. In response, the mobile device could apply the policies associated that Space 2. Subsequently, the user might enter one of the classrooms (Space 3), the gym or locker room (Space 4), the cafeteria (Space 5), or the library (Space 6), in which case the mobile device could again determine its location, find that it has moved into a new space, and apply the policies associated with its new space.

By referring to policy information that defines spaces and associates the defined spaces with notification, origination, and/or application policies, a mobile device can determine on its own what policies to apply. For example, the mobile device could periodically determine its location, compare its location to the spaces defined in the policy information to determine which space it is currently operating in, and apply the policies that are associated with the space where it is currently operating.

Some or all of the functions described above and illustrated in FIGS. 7-11 could be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other.

The computing device that executes the stored instructions could be a server device, such as server device 200 illustrated in FIG. 2A. In that case, the non-transitory computer readable medium could correspond to data storage 208. Alternatively, the computing device that executes the stored instructions could be a client device, such as client device 300 illustrated in FIG. 3. In that case, the non-transitory computer readable medium could correspond to data storage 310. The client device could be a mobile device, such as mobile device 400 illustrated in FIG. 4.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   determining, by a mobile device and according to a first reporting frequency, a first location of the mobile device;
   sending, by the mobile device, a query including the first location; after a determination that a first space is within a predetermined distance of the first location and that the first space does not include the first location, receiving, by the mobile device, policy information that defines at least the first space and associates the first space with at least a first notification policy regarding how the mobile device is permitted to provide notifications in response to incoming communications when operating within the first space;
   after a determination that the first space is within the predetermined distance of the first location:
   receiving a command to increase the first reporting frequency to a second reporting frequency, and
   according to the second reporting frequency:
   determining, by the mobile device, a second location of the mobile device and sending, by the mobile device, a query including the second location; and
   applying the first notification policy in response to a determination that the second location is within the first space.

2. The method of claim 1, wherein the policy information further defines a second space and associates the second space with a second notification policy regarding how the mobile device is permitted to provide notifications in response to incoming communications when operating within the second space.

3. The method of claim 2, further comprising:
   determining, by the mobile device, a new location of the mobile device, the new location being different from the second location; and
   comparing, by the mobile device, the new location of the mobile device to the first space.

4. The method of claim 3, further comprising:
   responsive to a determination that the new location is within the first space, continuing to apply the first notification policy on the mobile device.

5. The method of claim 3, further comprising:
   responsive to a determination that the new location is not within the first space, comparing, by the mobile device, the new location to the second space; and
   responsive to a determination that the new location is within the second space, applying the second notification policy on the mobile device instead of the first notification policy.

6. The method of claim 1, further comprising:
   determining, by the mobile device, a new location of the mobile device;
   transmitting, from the mobile device, an indication of the new location; and
   receiving, by the mobile device, new policy information that defines at least a second space and associates the second space with a second notification policy regarding how the mobile device is permitted to provide notifications in response to incoming communications.

7. The method of claim 6, further comprising:
   comparing, by the mobile device, the new location to the second space defined in the new policy information; and
   responsive to a determination that the new location is within the second space, applying the second notification policy on the mobile device instead of the first notification policy.

8. The method of claim 1, wherein the first notification policy specifies that audible notifications are permissible in response to incoming communications.

9. The method of claim 8, wherein the first notification policy specifies a maximum volume level for audible notifications.

10. The method of claim 1, wherein the first notification policy specifies that audible notifications are not permissible in response to incoming communications.

11. The method of claim 1, wherein the first notification policy specifies that tactile notifications are permissible in response to incoming communications.

12. The method of claim 1, wherein the first notification policy specifies that visible notifications are permissible in response to incoming communications.

13. A mobile device, comprising: at least one processor; data storage; instructions stored in the data storage and executable by the at least one processor to cause the mobile device to perform functions, the functions comprising:
   determining a first location of the mobile device according to a first reporting frequency; sending a query including the first location; after a determination that a first space is within a predetermined distance of the first location and that the first space does not include the first location, receiving policy information that defines at least a first space and associates the first space with at least a first notification policy regarding how the mobile device is permitted to provide notifications in response to incoming communications when operating within the first space;
   after a determination that the first space is within the predetermined distance of the first location:
   receiving a command to increase the first reporting frequency to a second reporting frequency, and
   according to the second reporting frequency:
   determining, by the mobile device, a second location of the mobile device and sending, by the mobile device, a query including the second location;
   comparing the second location of the mobile device to at least the first space defined in the policy information; and
   in response to a determination that the second location is within the first space, applying the first notification policy.

14. A non-transitory computer readable medium having stored therein instructions executable by at least one processor in a mobile device to cause the mobile device to perform functions, the functions comprising:
   determining a first location of the mobile device at a first reporting frequency; sending a query including the first location; after a determination that a first space is within a predetermined distance of the first location and that the first space does not include the first location, receiving policy information that defines at least a first space and associates the first space with at least a first notification policy regarding how the mobile device is permitted to provide notifications in response to incoming communications when operating within the first space;
   after a determination that the first space is within the predetermined distance of the first location:
   receiving a command to increase the first reporting frequency to a second reporting frequency, at the second reporting frequency:
   determining, by the mobile device, a second location of the mobile device and sending, by the mobile device, a query including the second location;

comparing the second location of the mobile device to at least the first space defined in the policy information; and in response to a determination that the second location is within the first space, applying the first notification policy.

15. The method of claim 1, wherein the query further comprises an identification of the mobile device.

* * * * *